(12) United States Patent
Hironishi et al.

(10) Patent No.: US 9,154,233 B2
(45) Date of Patent: Oct. 6, 2015

(54) FREQUENCY MODULATION SIGNAL DEMODULATOR AND LIGHT RECEIVING APPARATUS

(71) Applicant: FUJITSU LIMITED, Kawasaki-shi, Kanagawa (JP)

(72) Inventors: Kazuo Hironishi, Yokohama (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/451,776

(22) Filed: Aug. 5, 2014

(65) Prior Publication Data
US 2015/0050018 A1 Feb. 19, 2015

(30) Foreign Application Priority Data

Aug. 16, 2013 (JP) ................................. 2013-169202

(51) Int. Cl.
*H04B 10/00* (2013.01)
*H04B 10/67* (2013.01)
*H04B 10/077* (2013.01)
*H04L 27/148* (2006.01)

(52) U.S. Cl.
CPC .......... *H04B 10/676* (2013.01); *H04B 10/0775* (2013.01); *H04L 27/148* (2013.01)

(58) Field of Classification Search
CPC ............... H04B 10/548; H04B 10/556; H04B 10/5563; H04B 10/66; H04B 10/675; H04B 10/676; H04B 10/677
See application file for complete search history.

(56) References Cited

U.S. PATENT DOCUMENTS

| 2006/0072927 | A1* | 4/2006 | Kim et al. ..................... 398/214 |
| 2012/0128359 | A1* | 5/2012 | Mazzone et al. ................ 398/67 |
| 2012/0328297 | A1* | 12/2012 | Hoshida ......................... 398/85 |
| 2013/0045016 | A1* | 2/2013 | Doran et al. ................... 398/214 |
| 2013/0108279 | A1* | 5/2013 | Bratkovski et al. ........... 398/202 |
| 2013/0243430 | A1* | 9/2013 | Hironishi et al. .............. 398/48 |
| 2014/0140692 | A1* | 5/2014 | Oda et al. ....................... 398/23 |
| 2014/0219662 | A1* | 8/2014 | Hironishi et al. .............. 398/79 |

FOREIGN PATENT DOCUMENTS

JP 2-96719 4/1990
WO WO 2010/026757 3/2010

* cited by examiner

*Primary Examiner* — Daniel Dobson
(74) *Attorney, Agent, or Firm* — Staas & Halsey LLP

(57) ABSTRACT

A frequency modulation signal demodulator includes: an optical signal that has a wavelength, a frequency modulation signal being superimposed onto the optical signal; an optical filter that inputs the optical signal and has a central wavelength of a pass band at a wavelength that is shifted from a central wavelength of a spectrum of the optical signal and that is set to allow the pass band to be located at one portion of the spectrum; and an asymmetry optical interferometer that demodulates the frequency modulation signal by splitting light which has passed through the optical filter, delaying different time between split lights, and interfering the split lights.

7 Claims, 20 Drawing Sheets

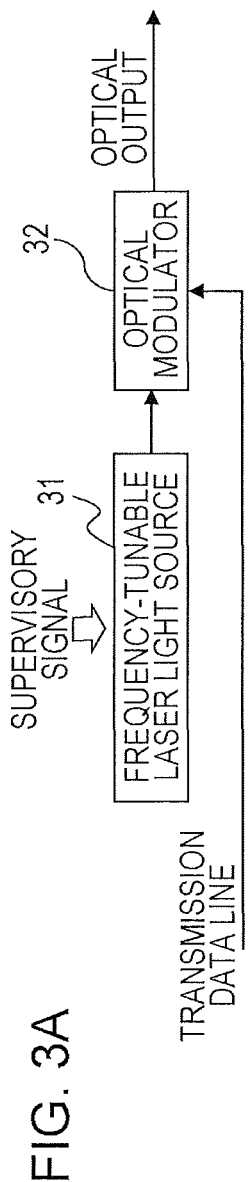
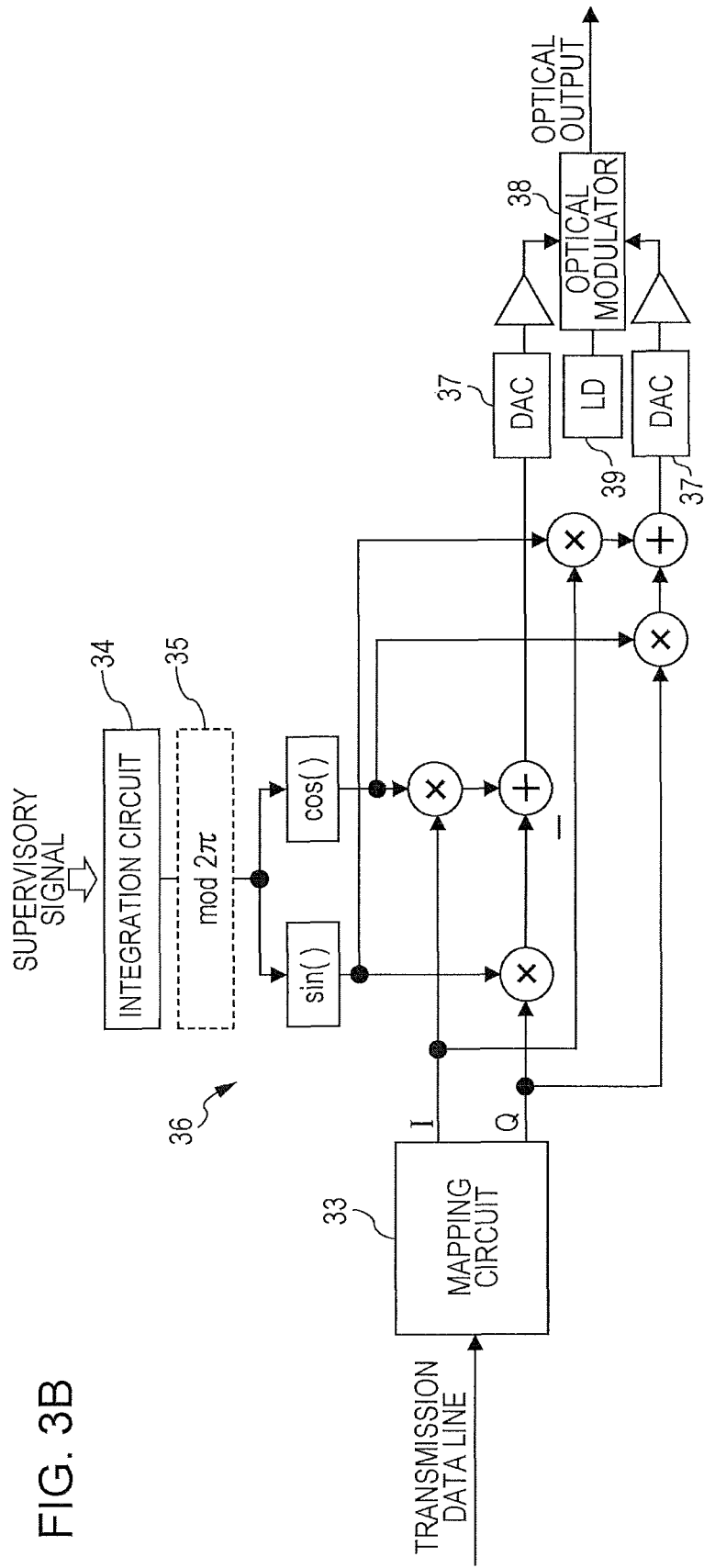
FIG. 3A
FIG. 3B

| $a_{n-1}$ | $a_n$ | $b_n$ |
|---|---|---|
| 1 | 0 | 1 |
| 0 | 1 | 1 |
| 1 | 1 | 0 |
| 0 | 0 | 0 |

FREQUENCY MODULATION SIGNAL DEMODULATOR AND LIGHT RECEIVING APPARATUS

CROSS-REFERENCE TO RELATED APPLICATION

This application is based upon and claims the benefit of priority of the prior Japanese Patent Application No. 2013-169202, filed on Aug. 16, 2013, the entire contents of which are incorporated herein by reference.

FIELD

The embodiments discussed herein are related to a frequency modulation signal demodulator and a light receiving apparatus.

BACKGROUND

In recent years, with the spread of reconfigurable optical add/drop multiplexers (ROADM), availability of a network connection has increased. For this reason, there is an increasing demand for a function that may observe a network connection status in a simple manner. As one example of a technology that meets such a demand, a technology has been known that superimposes a control signal such as a supervisory signal onto an optical signal that carries data.

For example, in a WDM transmission system, the control signal for identifying an optical path is superimposed onto the optical signal (a main optical signal) of each wavelength (channel), which is included in a WDM signal. In this case, the optical transmission apparatus (hereinafter referred to as a "node") or a receiver may recognize a transmission source of the optical signal and a path of the optical signal by demodulating the control signal from the received optical signal.

In such a light transmitting system, data on each channel is modulated, for example, in a multi-level modulation manner such as QPSK, mQAM (m is 16, 64, and 256) and thus is transmitted along an optical transmission path. On the other hand, the control signal such as the supervisory signal, for example, is superimposed on main signal light in a frequency shift keying (FSK) manner.

Moreover, although an object of the disclosure is different, International Publication Pamphlet No. WO 2010/026757 discusses that a transmission apparatus phase-modulates or frequency-modulates an optical signal, which is phase-modulated based on a first signal, based on a second signal that is slower in speed than the first signal, and thus transmits the phase- or frequency-modulated optical signal. Furthermore, a receiving apparatus disclosed in International Publication Pamphlet No. WO 2010/026757 splits the optical signal received from a transmitting apparatus, performs delaying interference on one split optical signal and thus outputs interference light. Then, the receiving apparatus converts the interference light into an electric signal, and thus obtains the second signal based on the full-wave rectified signal and obtains the first signal based on the other split signal. Accordingly, in the technology disclosed in International Publication Pamphlet No. WO 2010/026757, multiple signals that are different in speed may be multiplexed, and information may be multiplexed in the shape of a single peak spectrum in a single wavelength slot.

Furthermore, Japanese Laid-open Patent Publication No. 02-096719 discusses an optical signal demodulation circuit including an optical filter that allows a specific optical frequency for the optical signal that is frequency-modulated to an n value (n is an integer that is 2 or greater) to pass through and a light receiving element that receives light that passes through the optical filter. The optical filter disclosed in Japanese Laid-open Patent Publication No. 02-096719 is a Mach-Zehnder type periodic optical filter that outputs optical frequencies corresponding to the n values to different output ports.

If the control signal is superimposed onto the optical signal in a frequency shift keying manner, the receiver, for example, demodulates the control signal by converting a frequency modulation component of the optical signal into an amplitude component. However, in this case, when the frequency modulation component for superimposing the control signal onto the optical signal is large (that is, when a range of frequency change is wide), there is a concern that quality of data (for example, an error rate) that is carried by that optical signal will deteriorate. For this reason, it is preferable that the frequency modulation component for superimposing the control signal onto the optical signal be small enough for the quality of the data not to deteriorate.

When the frequency modulation component of the optical signal is small, the amplitude component that is obtained from the frequency modulation component is also small in the receiver. In such a case, the amplitude component that is obtained from the frequency modulation component of the optical signal is easily influenced by an intensity modulation noise (an AM noise) that occurs in a transmission path between the transmitter and the receiver and the like. Therefore, detection sensitivity of the control signal is decreased in the receiver.

Moreover, the detection sensitivity of the frequency modulation signal that is superimposed onto the optical signal is not disclosed in International Publication Pamphlet No. WO 2010/026757 and Japanese Laid-open Patent Publication No. 02-096719.

SUMMARY

According to an aspect of the embodiments, a frequency modulation signal demodulator includes: an optical signal that has a wavelength, a frequency modulation signal being superimposed onto the optical signal; an optical filter that inputs the optical signal and has a central wavelength of a pass band at a wavelength that is shifted from a central wavelength of a spectrum of the optical signal and that is set to allow the pass band to be located at one portion of the spectrum; and an asymmetry optical interferometer that demodulates the frequency modulation signal by splitting light which has passed through the optical filter, delaying different time between split lights, and interfering the split lights.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 3A and 3B illustrate examples of an optical transmitter that has a function to superimpose a supervisory signal;

DESCRIPTION OF EMBODIMENTS

Figure 1:
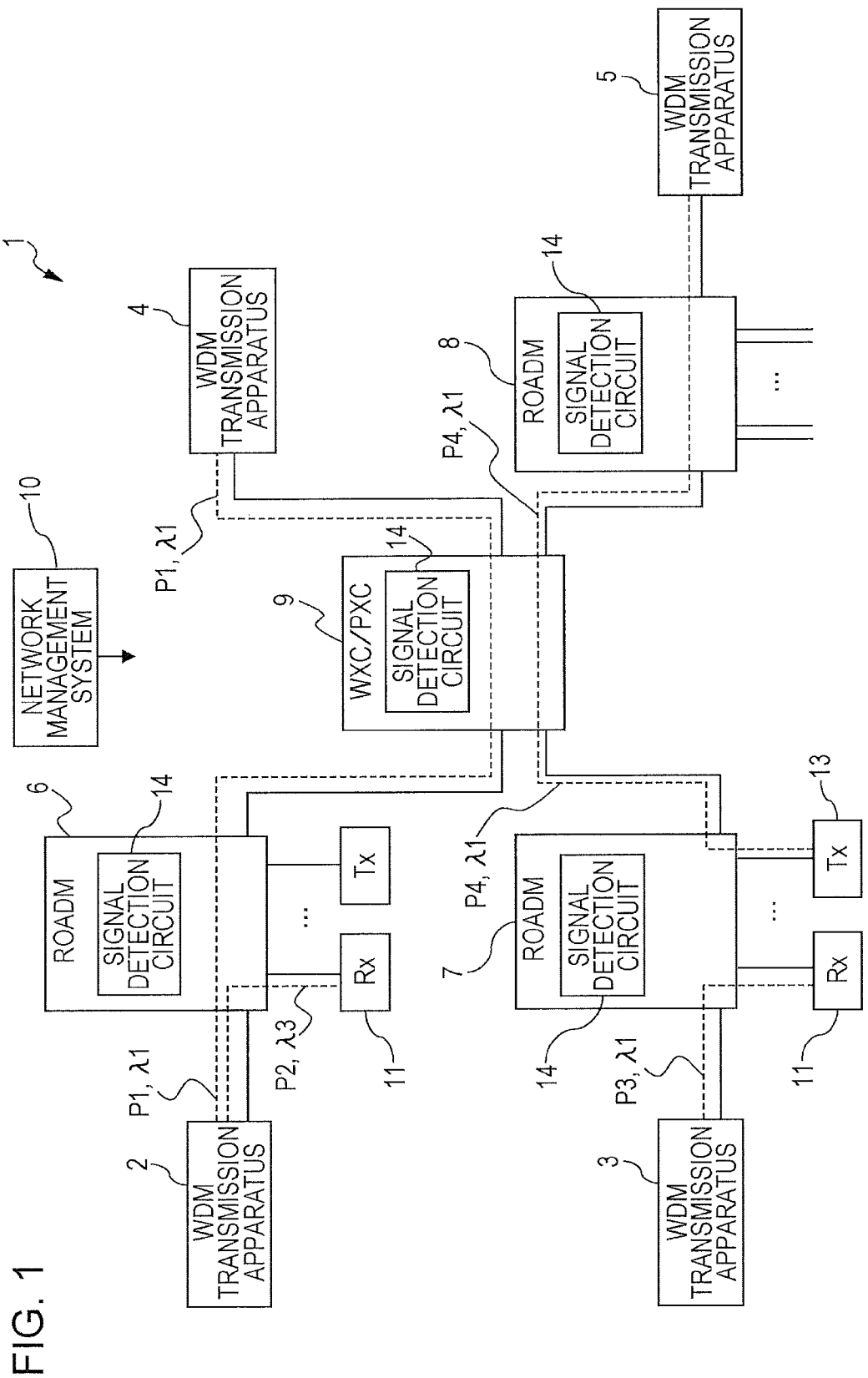
FIG. 1 illustrates an example of an optical transmission system.

Hereinafter, embodiments of the present disclosure are described below referring to the drawings. However, the embodiments that are described below are only examples, and this is not intended to exclude modifications or applications of the technology that are not specified below. Moreover, in the drawings that are referred to when describing the embodiments below, portions that are given the same reference numeral are the same or similar, except as otherwise specified.

FIG. 1 illustrates an example of an optical transmission system in which a signal detection circuit according to embodiments of the present invention is used. An optical transmission system 1 illustrated in FIG. 1 includes WDM transmission equipment 2-5, reconfigurable optical add/drop multiplexers (ROADMs) 6-8, a wavelength cross connect (WXC) (or photonic cross connect (PXC)) 9, and a network management system (NMS) 10.

The WDM transmission equipment 2, 3 and 5 are connected to the reconfigurable optical add/drop multiplexers 6, 7 and 8 via the optical fiber links, respectively. The reconfigurable optical add/drop multiplexers 6, 7 and 8 are connected to the wavelength cross connect 9 via optical fiber links, respectively. The WDM transmission equipment 4 is connected to the wavelength cross connect 9 via an optical fiber link. Note that one or more optical amplifiers may be provided on each of the optical fiber links.

Each of the WDM transmission equipment 2-5 transmits and receives a WDM optical signal including a plurality of optical signals having different wavelengths. Each of the reconfigurable optical add/drop multiplexers 6-8 may transmit an optical signal of a specified wavelength channel among the received WDM optical signal. Further, each of the reconfigurable optical add/drop multiplexers 6-8 may branch an optical signal having a specified wavelength among the received WDM optical signal and guides the branched optical signal to a client circuit. Further, each of the reconfigurable optical add/drop multiplexers 6-8 may insert, into a WDM optical signal, an optical signal inputted from a client circuit. The wavelength cross connect 9 includes a plurality of input ports and a plurality of output ports, and guides an input signal to an output port so as to realize a specified optical path. Note that, although not clearly indicated, the wavelength cross connect 9 may have a function of branching an optical signal to a client circuit, and a function of inserting an optical signal into a WDM optical signal similarly to the reconfigurable optical add/drop multiplexers 6-8.

In the optical transmission system 1, the network management system 10 provides an optical path designated by a user. That is, the network management system 10 controls the WDM transmission equipment 2-5, the reconfigurable optical add/drop multiplexers 6-8, and the wavelength cross connect 9 so as to realize the optical path designated by the user.

In the example illustrated in FIG. 1, optical paths P1 to P4 are provided in the optical transmission system 1. Each of the optical paths is represented by a broken line. The optical path P1 transmits an optical signal from the WDM transmission equipment 2 to the WDM transmission equipment 4 via the reconfigurable optical add/drop multiplexer 6 and the wavelength cross connect 9. The optical path P2 transmits an optical signal from the WDM transmission equipment 2 to a client 11 via the reconfigurable optical add/drop multiplexer 6. The optical path P3 transmits an optical signal from the WDM transmission equipment 3 to a client 12 via the reconfigurable optical add/drop multiplexer 7. The optical path P4 transmits an optical signal from a client 13 to the WDM transmission equipment 5 via the reconfigurable optical add/drop multiplexer 7, the wavelength cross connect 9, and the reconfigurable optical add/drop multiplexer 8. Note that each of the optical paths P1 to P4 may bi-directionally transmit optical signals.

In the optical transmission system 1 configured as described above, the network management system 10 may assign a same wavelength to different optical paths in order to efficiently or flexibly use communication resources. In the example illustrated in FIG. 1, wavelengths λ1, λ3, λ1 and λ1 are assigned to the optical paths P1, P2, P3 and P4, respectively.

A user or a network administrator sometimes wants to check whether or not the optical paths are correctly implemented. However, when the same wavelength is assigned to a plurality of optical paths, it is difficult to identify each of the optical paths only by monitoring the spectrum of each of the wavelength channels. For example, in the wavelength cross connect 9, it is difficult to identify the optical paths P1 and P4 only by monitoring the spectrum of each of the wavelength channels.

Thus, the network management system 10 assigns a path ID to each of the optical paths. By so doing, a transmission source apparatus of an optical path superimposes a supervisory signal representing a path ID on an optical signal to be transmitted via the optical path. For example, the WDM transmission equipment 2 superimposes a supervisory (SV) signal representing "path ID=1" on an optical signal to be transmitted via the optical path P1, and superimposes a supervisory signal representing "path ID=2" on an optical signal to be transmitted via the optical path P2. In this example, the supervisory signal is superimposed on the optical signal by frequency modulation.

Optical transmission equipment includes a signal detection circuit 14 that detects a supervisory signal superimposed on an optical signal and acquires a path ID from the supervisory signal. In the example illustrated in FIG. 1, the optical transmission equipment corresponds to the reconfigurable optical add/drop multiplexers 6-8 and the wavelength cross connect 9. However, the signal detection circuit 14 need not necessarily be provided at all of the optical transmission equipment, and a plurality of the signal detection circuits 14 may be provided at one optical transmission equipment. Also, the signal detection circuit 14 may be implemented within the optical transmission equipment or may be configured to be connected to the optical transmission equipment. Further, the signal detection circuit 14 may be provided at the WDM transmission equipment 2-5.

Figure 2:
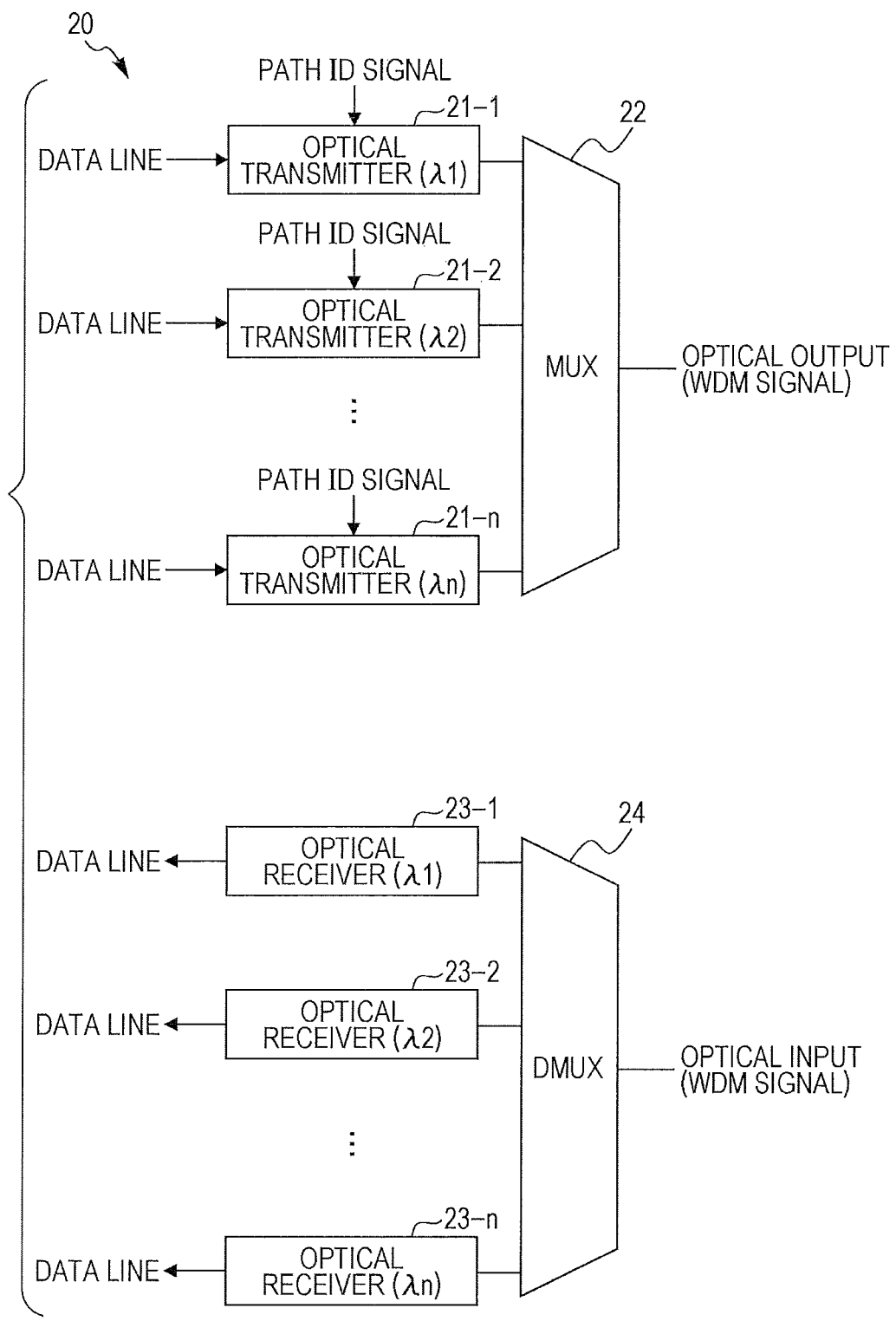
FIG. 2 illustrates a configuration of WDM transmission equipment.

FIG. 2 illustrates a configuration of WDM transmission equipment. In the example illustrated in FIG. 1, WDM transmission equipment 20 illustrated in FIG. 2 corresponds to the WDM transmission equipment 2-5. The WDM transmission equipment 20 includes optical transmitters 21-1 to 21-n, a multiplexer 22, optical receivers 23-1 to 23-n, and a demultiplexer 24.

Each of the optical transmitters 21-1 to 21-n generates an optical signal by modulating carrier light with an input data stream. The wavelengths λ1 to λn of the carrier light respectively used by the optical transmitters 21-1 to 21-n are different from each other (that is, different optical frequencies). The network management system 10 assigns path IDs to each of the optical transmitters 21-1 to 21-n. The path ID is given as a supervisory signal to each of the optical transmitters 21-1 to 21-n. The supervisory signal is, for example, a code having a specified length. In this case, the codes for identifying the respective optical paths are orthogonal to each other when the optical transmitters 21-1 to 21-n are used with a detector illustrated in FIG. 10. Further, the supervisory signals may be tone signals having mutually different frequencies. The tone signal is not limited in particular and is, for example, a sine wave signal. Note that the rate (the bit rate of the code, the frequency of the tone signal, and the like) of the supervisory signal is sufficiently low as compared with the rate of the data string.

Each of the optical transmitters 21-1 to 21-n can superimpose a supervisory signal on an optical signal by frequency modulation. That is, each of the optical transmitters 21-1 to 21-n can output an optical signal with a supervisory signal superimposed by frequency modulation. Further, the multiplexer 22 multiplexes the optical signals outputted from the optical transmitters 21-1 to 21-n to generate a WDM optical signal.

Note that the modulation schemes respectively used by the optical transmitters 21-1 to 21-n for modulating main signal data streams may not be the same as one another. For example, the WDM transmission equipment may be configured such that the optical transmitter 21-1 transmits a QPSK modulated optical signal, and the optical transmitter 21-2 transmits a 16QAM modulated optical signal. Further, the symbol rate or the bit rate of optical signals respectively outputted from the optical transmitters 21-1 to 21-n may not be the same as one another.

The demultiplexer 24 demultiplexes a WDM optical signal received via a transmission line, and outputs optical signals corresponding to the optical receivers 23-1 to 23-n. Each of the optical receivers 23-1 to 23-n recovers a data string by demodulating corresponding optical signal.

FIGS. 3A and 3B illustrate examples of an optical transmitter that has a function to superimpose a supervisory signal. The optical transmitter illustrated in FIGS. 3A and 3B is an example of the optical transmitters 21-1 to 21-n illustrated in FIG. 2. However, the configuration of superimposing a supervisory signal on an optical signal with frequency modulation is not limited to the configuration or the method illustrated FIG. 3A or FIG. 3B.

The optical transmitter illustrated in FIG. 3A includes a frequency tunable laser light source 31 and an optical modulator 32. The frequency tunable laser light source 31 generates continuous wave light having an oscillation frequency corresponding to a frequency control signal. Therefore, when a supervisory signal is given as the frequency control signal, the frequency tunable laser light source 31 generates continuous wave light having the oscillation frequency corresponding to the supervisory signal. The optical modulator 32 modulates, with a transmission data stream, the continuous wave light generated by the frequency tunable laser light source 31. As a result, the optical signal is generated with the supervisory signal superimposed by frequency modulation.

The optical transmitter illustrated in FIG. 3B realizes the frequency modulation based on digital signal processing. That is, a mapping circuit 33 maps a transmission data stream to an I component data stream and a Q component data stream. An integration circuit 34 integrates the supervisory signal. Note that, in the configuration illustrated in FIG. 3B, the supervisory signal f(t) is a digital data string representing an amplitude time waveform of a code or a tone signal. Further, the integration circuit 34 outputs, as an integration result, phase information θ(t) described below.

$$\theta(t) = \int 2\pi f(t) dt$$

A mod $2\pi$ circuit 35 converts the output value of the integration circuit 34 into a value within the range of 0 to $2\pi$. However, when the integration circuit 34 is designed to have the output range of 0 to $2\pi$, the mod $2\pi$ circuit 35 can be omitted.

A rotation operation circuit 36 rotates the I component data stream and the Q component data stream by the following operation using the phase information θ(t). Reference characters I and Q denote input data of the rotation operation circuit 36. Further, reference characters I' and Q' are output data of the rotation operation circuit 36.

$I'=I\cos\theta(t)-Q\sin\theta(t)$ $Q'=I\sin\theta(t)+Q\cos\theta(t)$

The data I' and the data Q', which are obtained by the rotation operation circuit 36, are respectively converted into analog signals by D/A converters 37, and given to an optical modulator 38. The optical modulator 38 generates a modulated optical signal by modulating, with the data I' and the data Q', the continuous wave light outputted from a laser light source 39. As a result, an optical signal is generated with the supervisory signal superimposed by frequency modulation.

Figure 4:
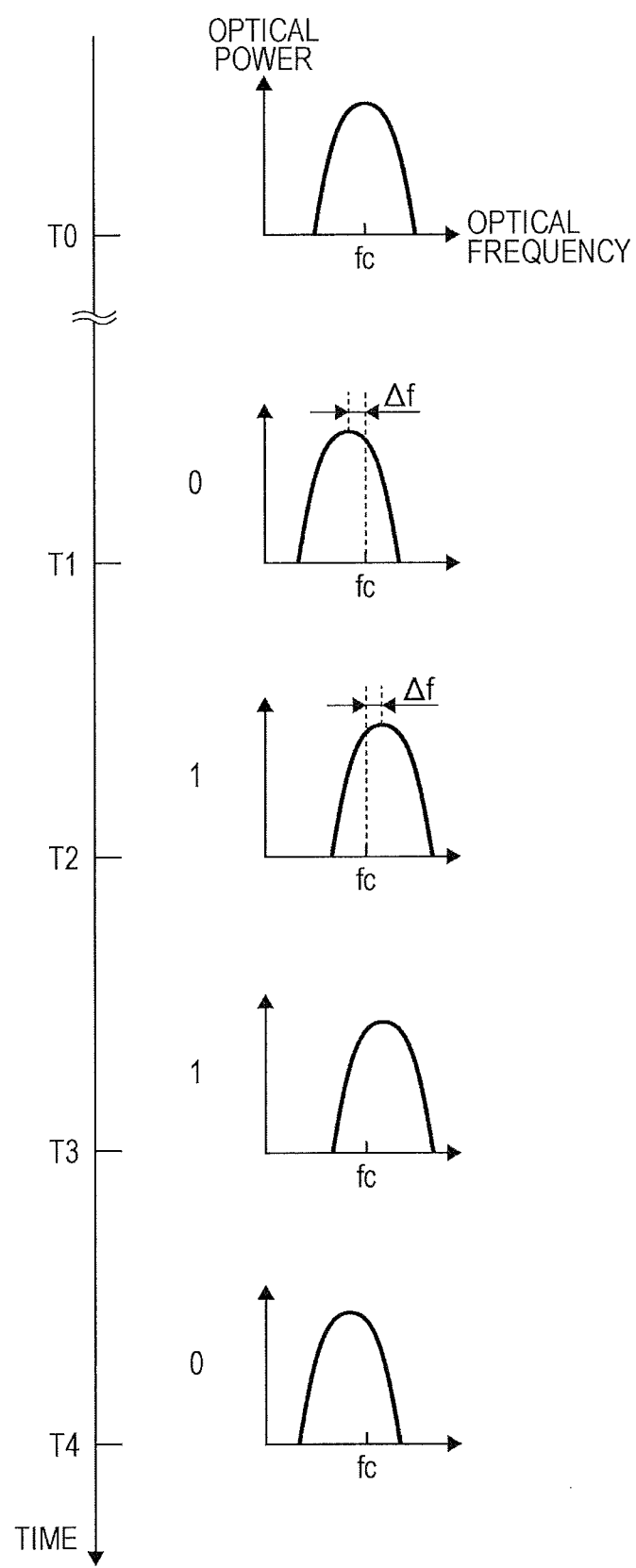
FIG. 4 is a view for illustrating frequency modulation.

FIG. 4 is a view for illustrating frequency modulation. FIG. 4 illustrates time-resolved output spectra of the optical transmitter at time points of T0, T1 to T4. The spread of the output optical spectrum at each of the time points represents a spread of spectrum caused by the modulation based on the transmission data stream, and can take various widths and shapes according to the modulation scheme and modulation rate of the main optical signal. As described with reference to FIGS. 3A and 3B, a supervisory signal is superimposed by frequency modulation on an optical signal outputted from the optical transmitter. In the example illustrated in FIG. 4, the supervisory signal is a digital code. The code superimposed on the optical signal at the time points of T1 to T4 is "0110". Further, the center frequency of the carrier light used by the optical transmitter is fc.

At time point T0, no supervisory signal is superimposed on the optical signal. In this case, the optical transmitter does not shift the center frequency of the optical signal. Therefore, the center frequency of the spectrum of the optical signal outputted at time point T0 is fc.

At time point T1, "0" is superimposed on the optical signal. In this case, in this example, the optical transmitter shifts the frequency of the optical signal by $-\Delta f$. Therefore, the center frequency of the spectrum of the optical signal outputted at time point T1 is $fc-\Delta f$.

At time point T2, "1" is superimposed on the optical signal. In this case, in this example, the optical transmitter shifts the frequency of the optical signal by $+\Delta f$. Therefore, the center frequency of the spectrum of the optical signal outputted at time point T2 is $fc+\Delta f$. Similarly, the center frequency of the spectrum of the optical signal outputted at time point T3 is $fc+\Delta f$, and the center frequency of the spectrum of the optical signal outputted at time point T4 is $fc-\Delta f$.

The frequency shift $\Delta f$ is sufficiently small as compared with the frequency of carrier light. Further, $\Delta f$ is determined so as not to interfere with the adjacent channel of the WDM transmission system. For example, in the WDM transmission system in which wavelength channels are arranged on a 50 GHz/100 GHz frequency grid specified by ITU-T, $\Delta f$ is not limited in particular but is set to about 1 MHz to 1 GHz.

In the example illustrated in FIG. 4, the frequency shift, at the time when the supervisory signal is "0" or "1", is respectively set to "$-\Delta f$" or "$+\Delta f$", but the present invention is not limited to this method. For example, the frequency shift, at the time when the supervisory signal is "0" or "1", may respectively be set to "$+\Delta f$" or "$-\Delta f$". Further, it may also be configured such that, when the supervisory signal is "0" (or "1"), the frequency shift is set to 0, and such that, when the supervisory signal is "1" (or "0"), the optical frequency is shifted. Further, a supervisory signal may be superimposed on an optical signal by using multi-level frequency shift keying other than binary frequency shift keying.

Note that, although the supervisory signal is a digital signal in the example illustrated in FIG. 4, the method for shifting the optical frequency is also substantially the same as the method used in the case where the supervisory signal is an analog signal. However, when the supervisory signal is an analog signal, the amount of the frequency shift is not discretely changed but is continuously changed.

Figure 5A:
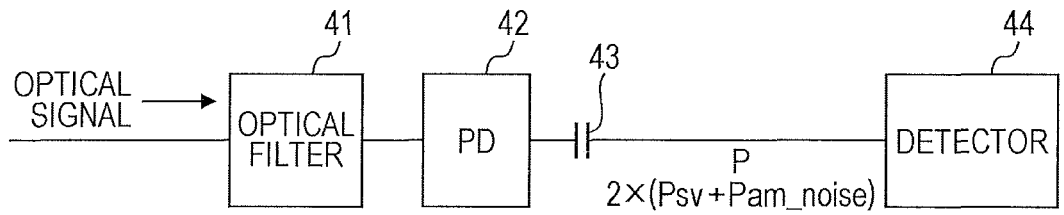
FIGS. 5A and 5B are views for illustrating detection of frequency modulated signals.
Figure 5B:
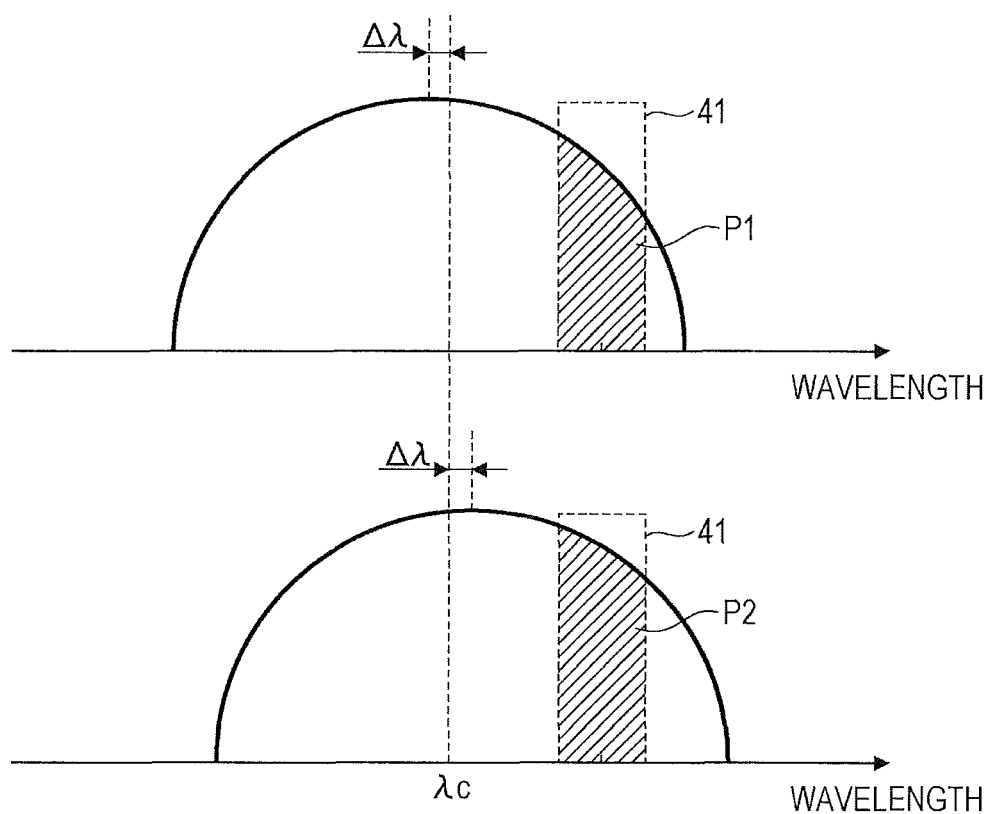

FIGS. 5A and 5B are views for illustrating detection of a frequency modulated signal. Here, an optical signal carries a data signal and a supervisory signal. As described above, the supervisory signal is superimposed (or multiplexed) on the optical signal with frequency modulation. That is, the supervisory signal is an example of a frequency modulated signal (or FSK signal). Therefore, in the following description, a supervisory signal may be referred to as an "FSK-SV signal". Note that the center wavelength of this optical signal is $\lambda c$.

For example, as illustrated in FIG. 5A, a circuit, that detects an FSK-SV signal from the above-described optical signal, includes an optical filter 41, a photo detector 42, a DC-removal capacitor 43, and a detector 44. Further, an input optical signal is guided to the optical filter 41.

As described above, the FSK-SV signal is multiplexed into the input optical signal with frequency modulation. For this reason, as illustrated in FIG. 5B, the center wavelength of the optical signal is changed in the range between $\lambda c-\Delta\lambda$ and $\lambda c+\Delta\lambda$ according to the FSK-SV signal. FIG. 5B illustrates spectra of the optical signal, and the transmission band (or pass band) of the optical filter 41.

The photo detector 42 converts the light outputted from the optical filter 41 (that is, the optical signal filtered by the optical filter 41) into an electrical signal. The electrical signal represents the power of the light outputted from the optical filter 41. Here, the power of the light outputted from the optical filter 41 is represented by the area of the hatched region illustrated in FIG. 5B. That is, when the center wavelength of the optical signal is $\lambda c-\Delta\lambda$, the power of the light outputted from the optical filter 41 is expressed as P1, while when the center wavelength of the optical signal is $\lambda c+\Delta\lambda$, the power of the light outputted from the optical filter 41 is expressed as P2.

The DC-removal capacitor 43 removes DC component from the electrical signal generated by the photo detector 42. Therefore, the electrical signal outputted from the DC-removal capacitor 43 represents the FSK-SV signal converted into an amplitude component. Note that the data signal is assumed to be averaged, for example, by (high frequency band side) electrical band limitation of the photo detector 42 or by a low pass filter (not illustrated). Alternatively, when the operation speed of the photo detector 42 is sufficiently low as compared with the symbol rate of the data signal, the data signal is averaged by the photo detector 42. The averaged data signal is substantially removed by the DC-removal capacitor 43. The detector 44 detects the FSK-SV signal from the output signal of the DC-removal capacitor 43.

However, the input optical signal includes AM noise. The AM noise is added to the optical signal, for example, in the transmission line between the optical transmitter and the optical receiver. Therefore, the signal P inputted to the detector 44 is expressed by the following expression. Note that $2\times Psv$ represents an amplitude component resulting from the FSK-SV signal. $2\times Pam\_noise$ represents AM noise. Note that, each of the amplitude component and the AM noise is expressed by being multiplied by 2 for consistency with the following description.

$$P=2\times(Psv+Pam\_noise)$$

The detector 44 detects the FSK-SV signal by detecting $2\times Psv$ from the signal P. Therefore, when Pam_noise is small as compared with Psv, the detector 44 can detect the FSK-SV signal with sufficient accuracy.

The magnitude of Psv depends on the frequency variation range (Δf in the example illustrated in FIG. 4) of the FSK-SV signal. However, when the frequency variation range of the FSK-SV signal is large, the quality (for example, error rate) of data carried by the optical signal may be deteriorated. For this reason, the frequency variation range of the FSK-SV signal is controlled to be small so as to prevent deterioration of the quality of data. Thus, it is difficult to increase the magnitude of Psv. That is, it is difficult to sufficiently increase the magnitude of Psv with respect to Pam_noise.

Figure 6:
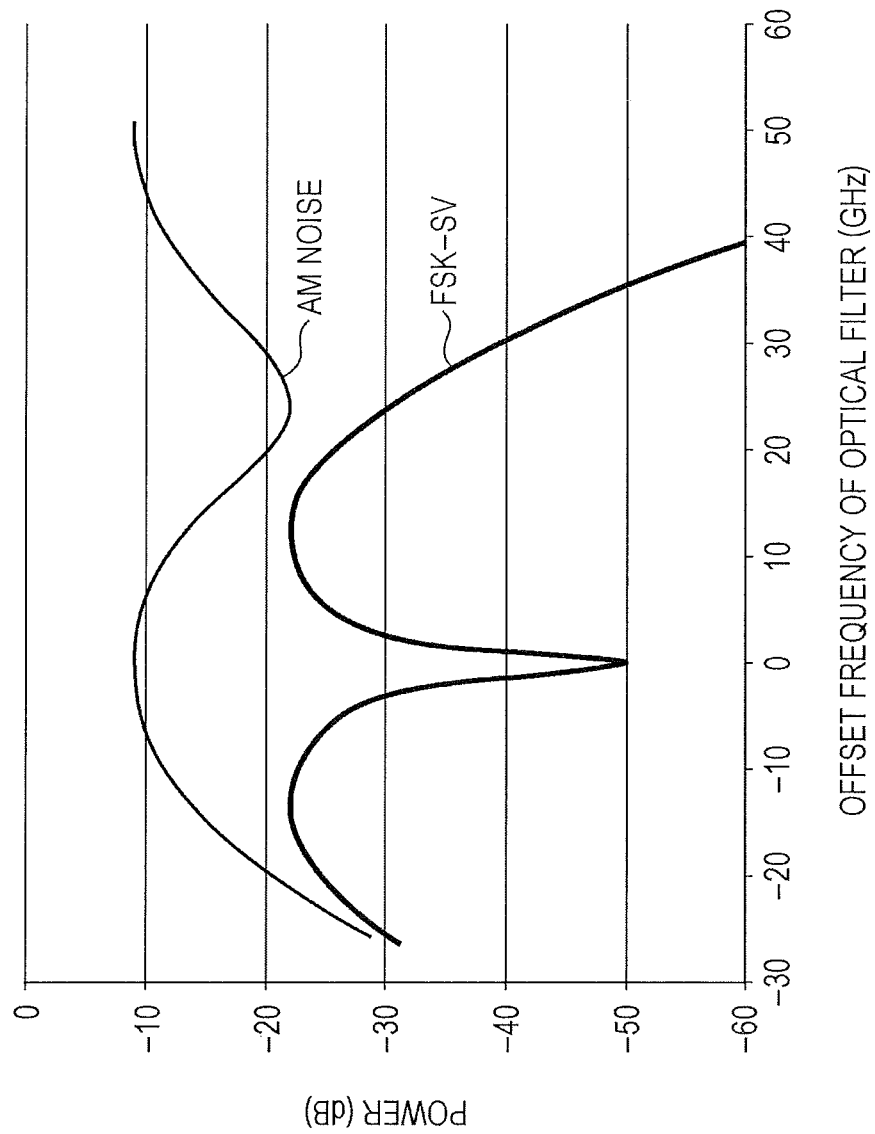
FIG. 6 illustrates simulation results about the power of converted amplitude output of a FSK-SV signal and the power of AM noise.

FIG. 6 illustrates simulation results about the power of the amplitude component of FSK-SV signal and the power of AM noise. The horizontal axis represents the difference (that is, offset frequency) between the center frequency of the optical signal and the center frequency of the transmission band of the optical filter 41. The frequency variation range of the FSK-SV signal is 100 MHz. The modulation depth of the AM noise is 2 percent. The width of the transmission band of the optical filter 41 is 20 GHz.

According to the simulation, the amplitude component of the FSK-SV signal is smaller than the AM noise. For example, even when the offset frequency is controlled so as to maximize the amplitude component of the FSK-SV signal, the amplitude component of the FSK-SV signal is smaller by about 7 dB than the AM noise. Therefore, it is difficult that the detection circuit illustrated in FIG. 5A detects the FSK-SV signal with sufficient sensitivity.

Figure 7:
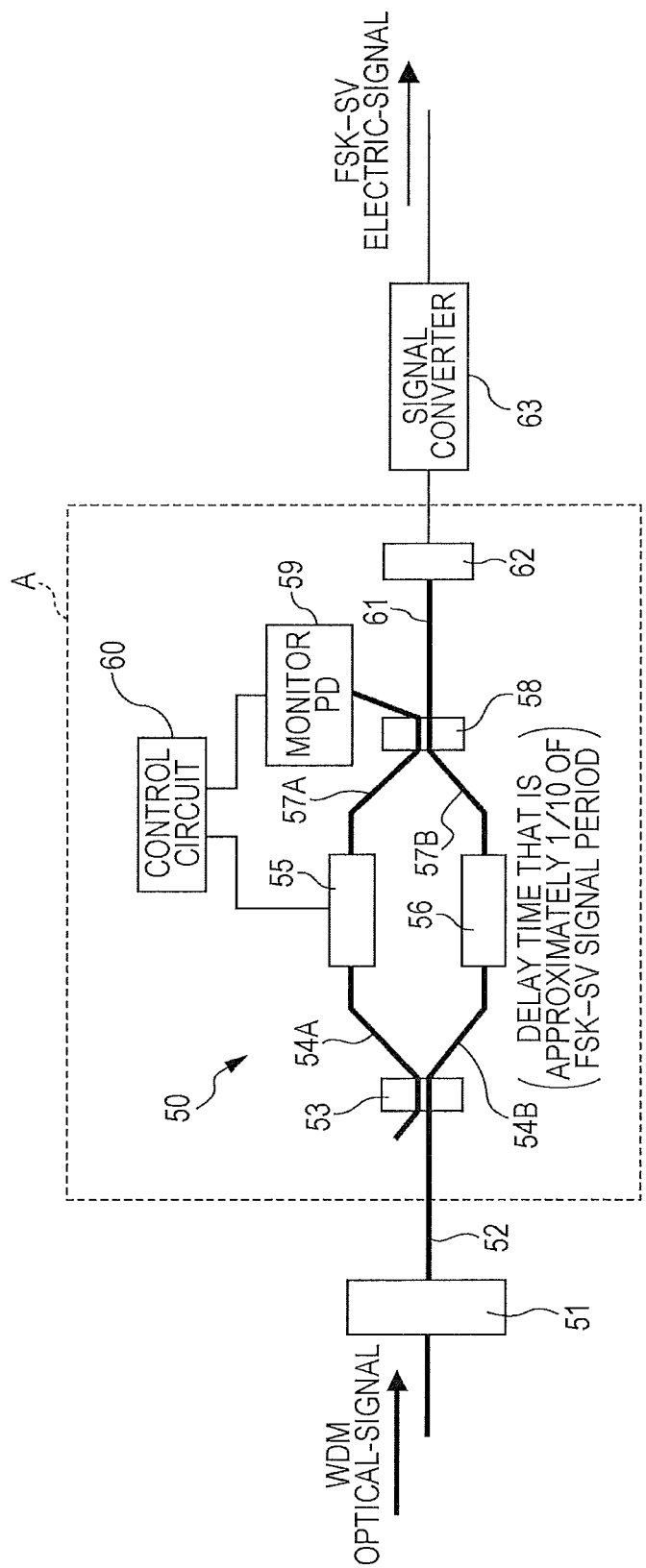
FIG. 7 is a block diagram illustrating a configuration example of an asymmetry interferometer-type FSK-SV signal demodulator as a signal demodulation circuit according to one embodiment.

FIG. 7 is a block diagram illustrating a configuration example of an asymmetry interferometer-type FSK-SV signal demodulator as the frequency modulation signal demodulator according to one embodiment. The asymmetry interferometer-type FSK-SV signal demodulator illustrated in FIG. 7 illustratively includes an optical filter 51, optical propagation paths 52, 54A, 54B, 57A, 57B, and 61, an optical splitter 53, an optical phase adjustment unit 55, an optical delay unit 56, an optical combiner 58, a monitor PD 59, a control circuit 60, a photoelectric converter 62, and a signal converter 63.

The optical filter 51 is, for example, a band pass filter (BPF), and illustratively has the pass band illustrated in FIG. 5B. That is, the BPF 51 illustratively has the central wavelength of the pass band at a wavelength that is shifted to the side of a long wavelength (or may be shifted to the side of a short wavelength), rather than the central wavelength λc, and has a bandwidth through which one portion of the optical signal band (the spectrum) of a wavelength channel, in the input WDM optical-signal, passes. The bandwidth may be illustratively set to a band narrower than half of the optical signal band of the wavelength channel. Light that passes through the BPF 51 includes an intensity modulation signal component that is in proportion to the FSK-SV signal. Moreover, the output optical power of the BPF 51 is also indicated by an area of a slanted-line region illustrated in FIG. 5B in the same manner as the optical filter 41 described above. That is, the output optical power of the BPF 51 is indicated with P1 when the central wavelength of the optical signal is λc−Δλ and is indicated with P2 when the central wavelength of the optical signal is λc+Δλ.

The optical propagation path 52 leads the optical signal that passes through the BPF 51, to the optical splitter 53. The optical signal that propagates along the optical propagation path 52 is the optical signal that includes an intensity modulation component and a frequency modulation component. Moreover, an optical fiber or an optical waveguide may be applied to the optical propagation path 52. The same embodiment holds in other optical propagation paths 54A, 54B, 57A, 57B and 61.

The optical splitter 53 splits the optical signal that is input from the optical propagation path 52, into two and thus outputs two optical signals to the optical propagation paths 54A and 54B, respectively. The optical splitter 53 may be realized using an optical coupler with two inputs and two outputs. In this case, one input port of the optical coupler may be an empty port.

The optical propagation path 54A leads one optical signal that is split in the optical splitter 53, to the optical phase adjustment unit 55. Furthermore, the optical propagation path 54B leads the other optical signal that is split in the optical splitter 53, to the optical delay unit 56.

The optical phase adjustment unit 55 adjusts a phase of the optical signal that is input from the optical propagation path 54A. The adjustment is monitored in the monitor PD 59 and is controlled by the control circuit 60 according to the output optical power of the optical combiner 58. The control is described in detail below.

The optical delay unit 56 delays the optical signal that is input from the optical propagation path 54B. A delay time is illustratively set to approximately one-tenth of an FSK-SV signal period. The optical delay unit 56 may be illustratively realized using an optical fiber delay line. For example, if the FSK-SV signal is equivalent to 1 MHz and a maximum frequency deviation is 100 MHz, when a linear frequency change is assumed with the optical fiber delay line being 20 m, a phase difference of approximately π/10 (refer to the upper portion of FIG. 8) may occur at a frequency changing point of the FSK-SV signal.

The optical propagation paths 57A and 57B lead the optical signals that are output from the optical phase adjustment unit 55 and the optical delay unit 56, respectively, to the optical combiner 58.

The optical combiner 58 causes the optical signals that are input from the optical propagation paths 57A and 57B, to interfere with each other and thus output interference light to the optical propagation path 61. One portion of the interference light is split and led to the monitor PD 59. The optical combiner 58 may be realized using the optical coupler with two inputs and two outputs.

The optical splitter 53 described above, and the optical propagation paths 54A, 54B, 57A, and 57B, the optical phase adjustment unit 55, the optical delay unit 56, and the optical combiner 58 are one example of an asymmetry-type optical interferometer 50.

The monitor PD 59 generates the electric signal according to the power of the optical signal that is input from the optical combiner 58, and thus outputs the generated electric signal to the control circuit 60.

The control circuit 60 controls an amount of phase adjustment by the optical phase adjustment unit 55 according to the power that is monitored in the monitor PD 59. In a time portion (a changing point of an FSK-SV signal pulse) in which values of FSK-SV signal components of the optical signals that are input from the optical propagation paths 57A and 57B, respectively, into the optical combiner 58 are different from each other, the control is illustratively performed such that the light is output to the photoelectric converter 62.

The optical propagation path 61 leads the light that is output from the optical combiner 58, to the photoelectric converter 62.

The photoelectric converter 62 converts the light that is input from the optical propagation path 61, into the electric signal. The electric signal is the electrical signal that indicates the frequency changing point (rising and falling) of the FSK- SV signal pulse, and has a signal speed two times that of the electric signal of the FSK-SV signal that is superimposed at the transmitting side.

The signal converter 63 reproduces pulse information on the FSK-SV signal that is superimposed at the transmitting side, from the electric signal that is input from the photoelectric converter 62 and which indicates the changing point of the FSK-SV signal pulse, and thus reproduces the FSK-SV signal.

In the asymmetry interferometer-type FSK-SV signal demodulator described above, first, the optical signal of one portion (a band narrower than half of the signal band) of the signal band of the wavelength is cut out from the input WDM optical-signal in the BPF 51. The cut-out optical signal has the central wavelength in a wavelength that is shifted from the central wavelength of the optical signal of the wavelength to the side of a long wavelength (or to the side of a short wavelength).

Subsequently, the optical signal that is cut out by the BPF 51 (that passes through the BPF 51) is input to the optical splitter 53 along the optical propagation path 52. The optical splitter 53 splits the optical signal that has been input into two and outputs one to the optical phase adjustment unit 55 and outputs the other to the optical delay unit 56.

The optical signal that is input into the optical delay unit 56 is illustratively delayed by approximately one-tenth of a signal period of the FSK-SV signal and thus is output to the optical combiner 58. The optical signal that is input into the optical phase adjustment unit 55 is phase-adjusted as described above and then is output to the optical combiner 58.

Figure 8:
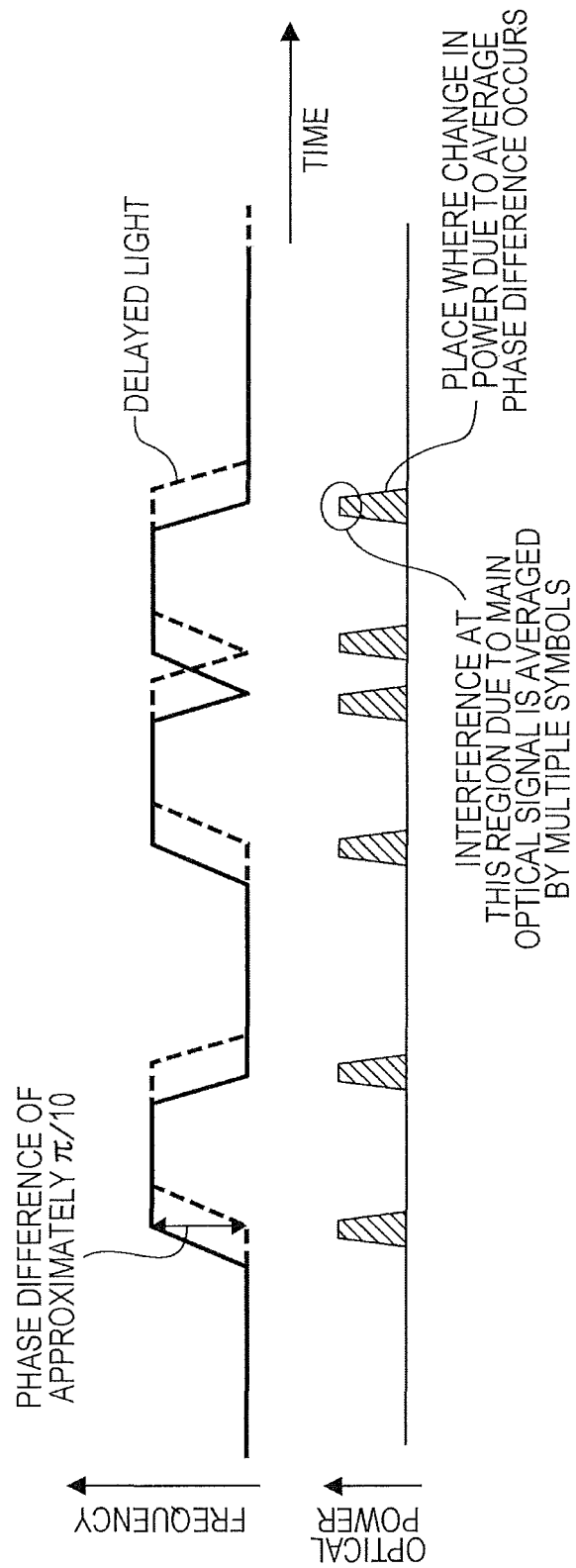
FIG. 8 is a diagram illustrating one example (on the upper portion) of a frequency change over time in each optical signal that is input into an optical combiner illustrated in FIG. 7 and one example (on the lower portion) of a change over time in output optical power of the optical combiner.

One example of the frequency change over time in each optical signal that is input into the optical combiner 58 is illustrated on the upper portion of FIG. 8. One example of the change over time in the output optical power of the optical combiner 58 is illustrated on the lower portion of FIG. 8. On the upper portion of FIG. 8, a waveform indicated with a solid line is equivalent to a waveform of the optical signal on which the delaying is not performed by the optical delay unit 56, and a waveform indicated with a dotted line is equivalent to a waveform of the optical signal on which the delaying is performed by the optical delay unit 56. Each optical signal relatively has a phase difference of approximately $\pi/10$ due to the presence or absence of the delaying.

As illustrated in FIG. 8, in the time portion (the changing point of the FSK-SV signal pulse) in which the values of FSK-SV signal components are different from each other, the optical combiner 58 outputs the light. In other words, the change in the optical power according to an average phase difference between the optical signal on which the delaying is performed by the optical delay unit 56 and the optical signal on which the delaying is not performed appears in the output of the optical combiner 58. For example, at the timing when the difference in value between the FSK-SV signal components (frequency components) reaches the maximum, a peak of the output light pulse occurs.

The optical pulse that is output from the optical combiner 58 as described above is output to the photoelectric converter 62 along the optical propagation path 61 and is converted into the electrical signal in the photoelectric converter 62. The electric signal indicates the frequency changing point of the FSK-SV signal pulse. The pulse information on the FSK-SV signal that is superimposed at the transmitting side is reproduced in the signal converter 63 and thus the FSK-SV signal is reproduced.

Figure 9:
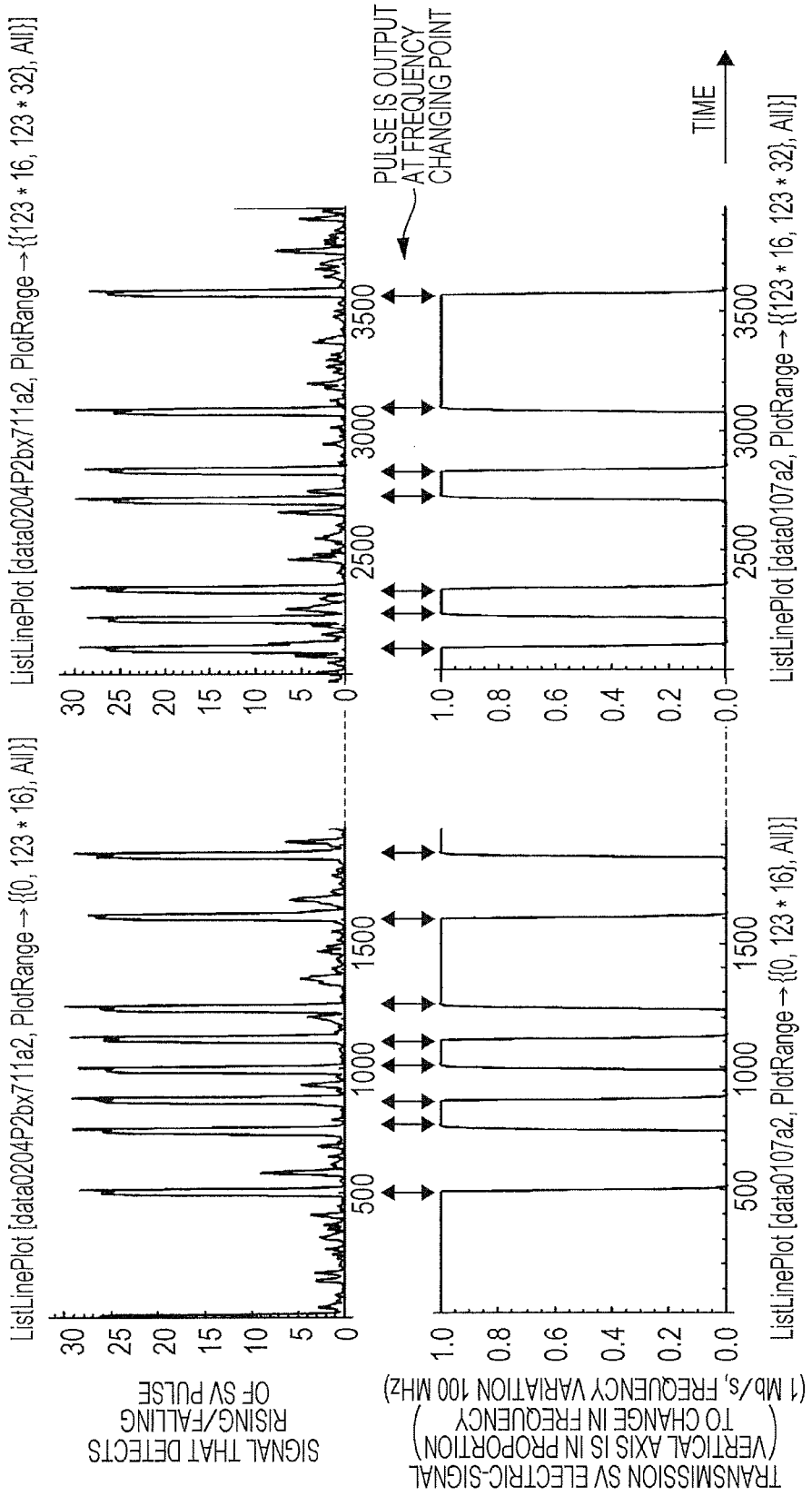
FIG. 9 is a diagram illustrating a waveform example (on the lower portion) of a transmission FSK-SV signal (an electric signal) and a waveform example (on the upper portion) of the electric signal that indicates a frequency changing point of the FSK-SV signal pulse described above.
Figure 10:
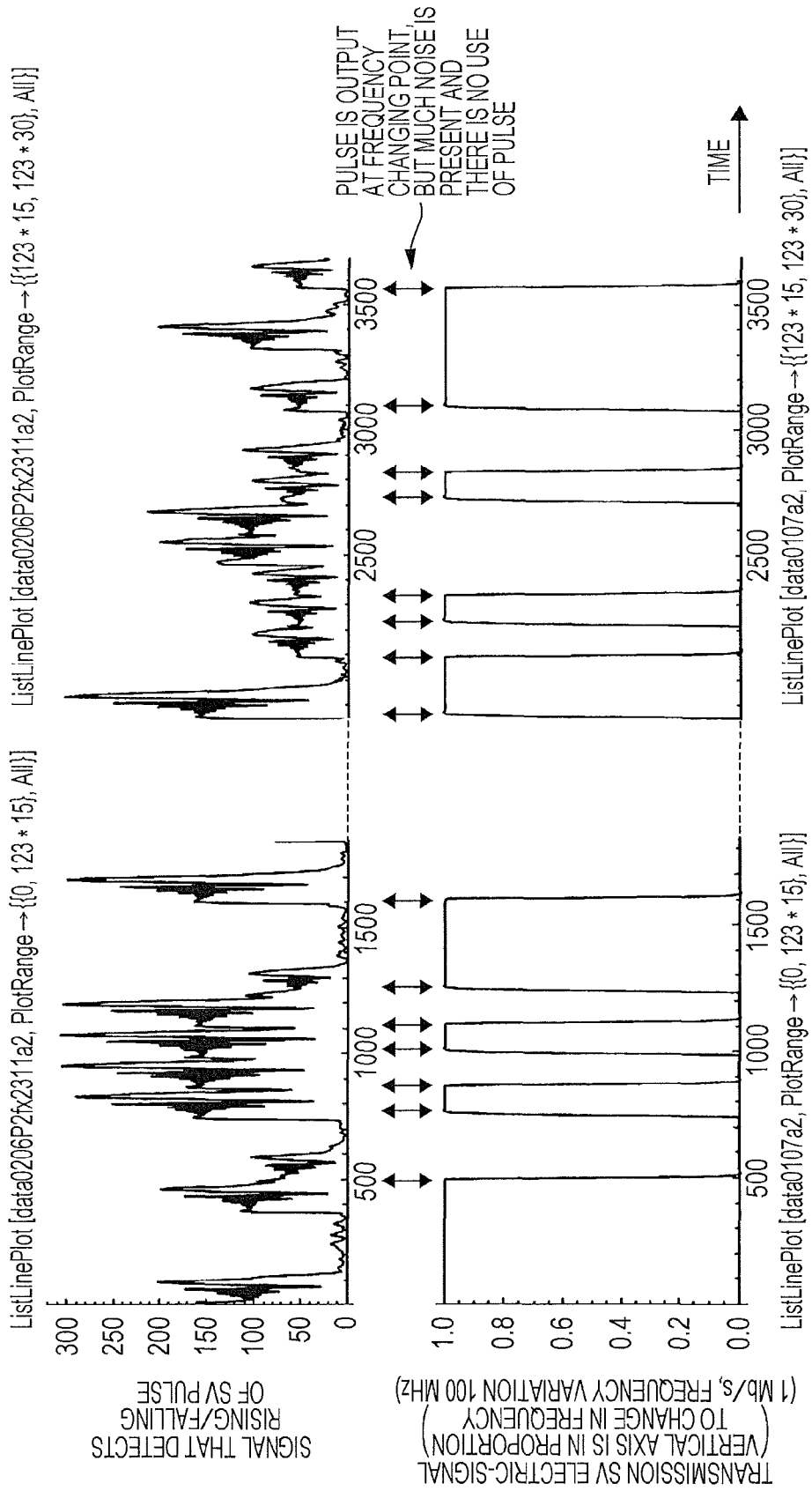
FIG. 10 is a diagram that is equivalent to FIG. 9 when a BPF illustrated in FIG. 7 is not provided.

FIG. 9 shows a waveform example (on the lower portion) of a transmission FSK-SV signal (the electric signal) and a waveform example (on the upper portion) of the electric signal that indicates the frequency changing point of the FSK-SV signal pulse described above. FIG. 9 shows the waveform example that results when the bit rate of the transmitted FSK-SV signal is 1 Mb/s and a frequency variation is 100 MHz. As understood from the comparison of the waveforms on the lower and upper portions of FIG. 9, a demodulation signal is obtained that has the peak in the frequency changing point (rising and falling) of the transmission FSK-SV signal pulse. As a comparative example, a waveform that is equivalent to that in FIG. 9 when the BPF 51 is not provided is illustrated in FIG. 10. As illustrated in FIG. 10, the pulse is output at the frequency changing point (rising and falling) of the transmission FSK-SV signal pulse, but because the pulse has much noise, the FSK-SV signal is difficult to reproduce with high precision.

Figure 11:
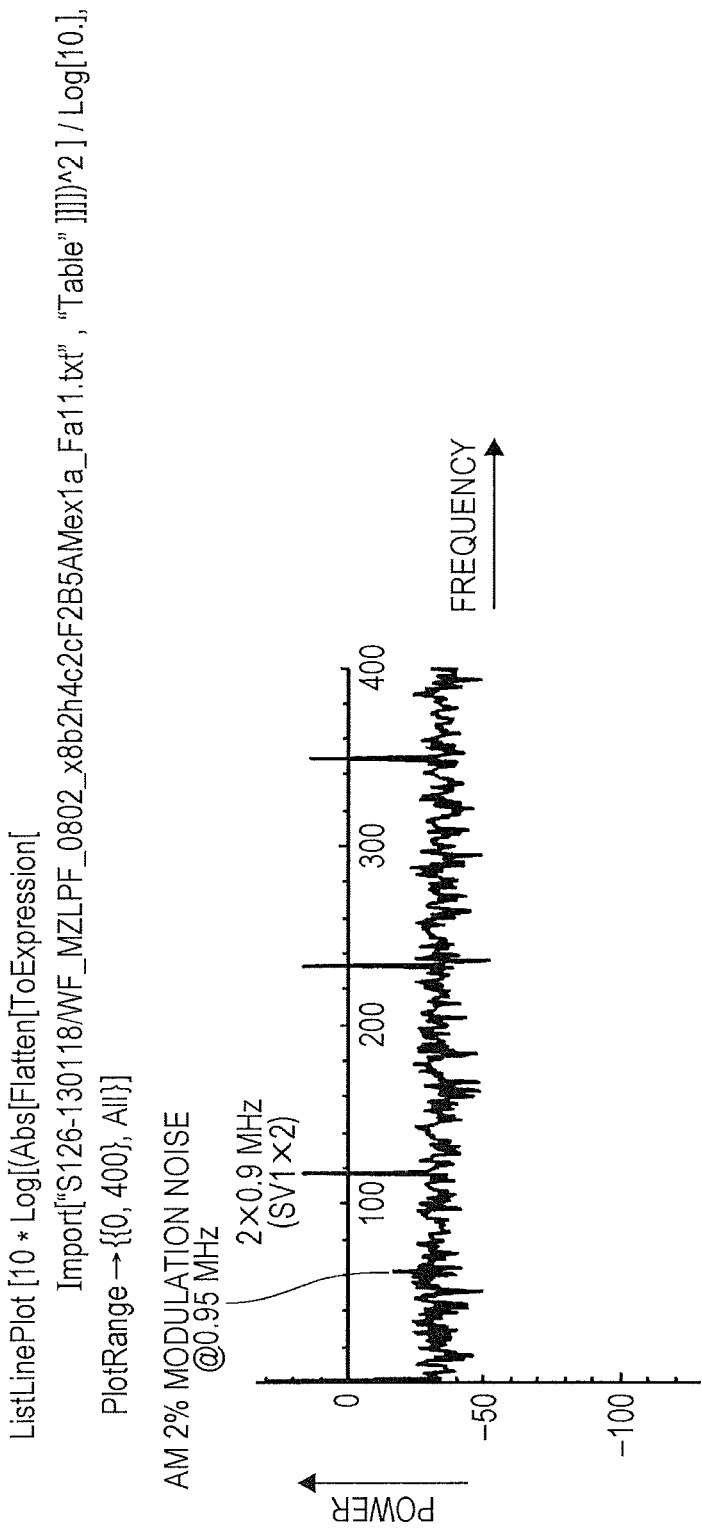
FIG. 11 is a diagram illustrating an output waveform example of a photoelectric converter that results when a pass band of the BPF illustrated in FIG. 7 is set to 20 GHz and an offset frequency is set to 10 GHz.

FIG. 11 shows an output waveform example of the photoelectric converter 62 that results when the pass band of the BPF 51 is set to 20 GHz and the offset frequency is set to 10 GHz. The horizontal axis of FIG. 11 indicates frequency, and the vertical axis indicates power. As shown in FIG. 11, a second harmonic wave of the FSK-SV signal is greater by 20 dB than the AM noise (a modulation factor of 2%). That is, from the comparison with the example in FIG. 6, it is apparent that a ratio of FSK-SV signal power and AM noise power (an SN ratio) is improved by approximately 30 dB.

Figure 12A:
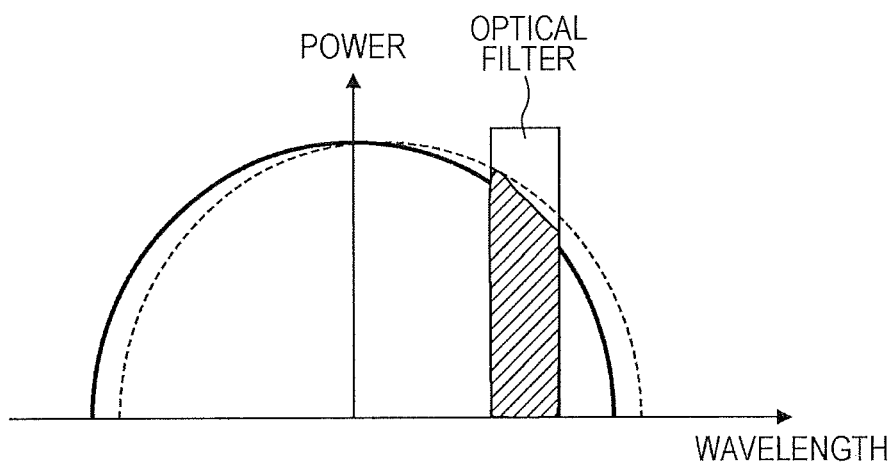
FIGS. 12A and 12B are conceptional diagrams, each illustrating an amount of light that may be used as an FSK-SV signal demodulator.
Figure 12B:
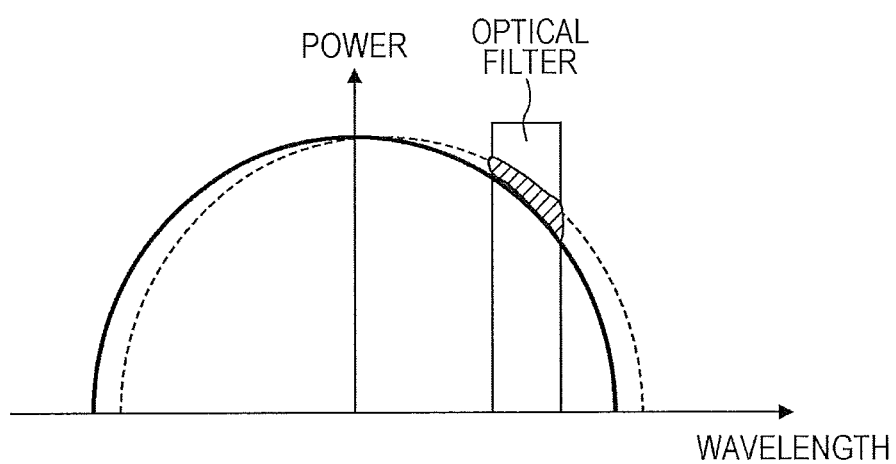

FIGS. 12A and 12B are diagrams, each illustrating a difference between an amount of light that may be used in an FSK-SV signal demodulator according to the present embodiment and an amount of light that may be used in an FSK-SV signal demodulator in the related art. As illustrated in FIG. 12B, in the FSK-SV signal demodulator in the related art, the amount of the change in the optical power that may be demodulated as the FSK-SV signal is (a portion indicated with the hatched region)×T (T=SV signal period), and an amount of light that may be used within one SV signal period is invariable and the amount of light itself is small. In contrast, as illustrated in FIG. 12A, in the FSK-SV signal demodulator according to the present embodiment, the amount of the change in the optical power that may be demodulated as the FSK-SV signal is (a portion indicated with the hatched region)×Tp (Tp=a width of the pulse signal that occurs within the Tp=SV signal period). Moreover, a relationship between Tp and T is Tp<T/10. That is, in the FSK-SV signal demodulator according to the present embodiment, although in the pulse operation, a total amount of light that shortly passes through the optical filter 51 may be used. For this reason, because the optical output at the times other than the pulse output time is almost zero, the signal with an instantaneous value greater than that of the FSK-SV signal demodulator in the related art may be obtained. Therefore, effects such as the AM noise may be further reduced.

Optical Phase Adjustment Control by Control Circuit 60

Next, one example of control of the optical phase adjustment unit 55 by the control circuit 60 is described. When briefly described, the control circuit 60 controls the optical phase adjustment unit 55 such that the average output power of the monitor PD 59 reaches the maximum, and thus it is possible to maximize the SN ratio of the optical signal that is output from the optical combiner 58.

In the optical interferometer 50 illustrated in FIG. 7, when the phase difference between the optical signals that pass through the two optical paths that run from the optical splitter 53 to the optical combiner 58 is an integer multiple of $2\pi$, all light is output to the port (hereinafter referred to as a "monitor port") that is connected to the monitor PD 59 of the optical combiner 58. In contrast, when the phase difference between the two optical signals is not an integer multiple of $2\pi$, the optical component is output to the port to which the photoelectric converter 62 of the optical combiner 58 is connected. Therefore, the following 4 cases are considered.

(1) There is a case where the phase difference between the two optical paths of the optical interferometer 50 is an integer multiple of $2\pi$ and the frequencies of the two optical signals that converge at the optical combiner 58 are the same. In this case, the light is output to the monitor port of the optical combiner 58.

(2) There is a case where the phase difference between the two optical paths of the optical interferometer 50 is an integer multiple of $2\pi$ and the frequencies of the two optical signals that converge at the optical combiner 58 are different from each other. In this case, the light is output to the port to which the photoelectric converter 62 of the optical combiner 58 is connected.

(3) There is a case where the phase difference between the two optical paths of the optical interferometer 50 is not an integer multiple of $2\pi$ and the frequencies of the two optical signals that converge at the optical combiner 58 are the same. In this case, the light is output to each of the monitor port of the optical combiner 58 and the port to which the photoelectric converter 62 is connected.

(4) There is a case where the phase difference between the two optical paths of the optical interferometer 50 is not an integer multiple of $2\pi$ and the frequencies of the two optical signals that converge at the optical combiner 58 are different from each other. In this case, the light is output to each of the monitor port of the optical combiner 58 and the port to which the photoelectric converter 62 is connected.

That is, if the phase difference between the two optical paths of the optical interferometer 50 is not an integer multiple of $2\pi$, regardless of the presence or absence of the frequency difference between the two optical signals that converge at the optical combiner 58, the light is output to both the monitor port of the optical combiner 58 and the port to which the photoelectric converter 62 is connected. For this reason, the SN of the optical signal demodulation at the frequency changing point deteriorates. In order to avoid the deterioration, for example, a phase condition for the two optical signals that converge at the optical combiner 58 is adjusted by the optical phase adjustment unit 55.

The optical phase adjustment unit 55 adjusts a phase of light with a medium (an optical waveguide, an optical fiber, or the like) along which the optical signal may propagate by changing a refractive index of the medium. If the refractive index of the medium is adjusted with a change in temperature, this may be done by changing temperatures of the optical waveguide and the optical fiber with an approaching heater, a Peltier element, or the like. Furthermore, when the optical waveguide is configured from a material that has an electrooptic effect, the phase of light may be adjusted by changing a voltage that is applied.

Furthermore, an optimal value of the delay time that is given to one optical signal by the optical delay unit 56 is determined by a modulation period T of the FSK-SV signal and rising time and falling time (tr/tf) of the frequency modulation of the optical signal. In such an optimal state (when the optical signal with the satisfactory SN ratio is output to the port to the photoelectric converter 62 of the optical combiner 58), the SN ratio of the optical signal reaches the maximum. For this reason, if the rising/falling time (tr/tf) of the frequency modulation of the optical signal is significantly small with respect to a frequency modulation period T, that is, if $(tr+tf) \ll T$, because the power of the optical signal that is input into the optical interferometer 50 is almost invariable over time, the output of the monitor port comes close to approximately $(T-(tr+tf))/T \times$ (the input port to the optical interferometer 50) and thus the output reaches the maximum.

Figure 13:
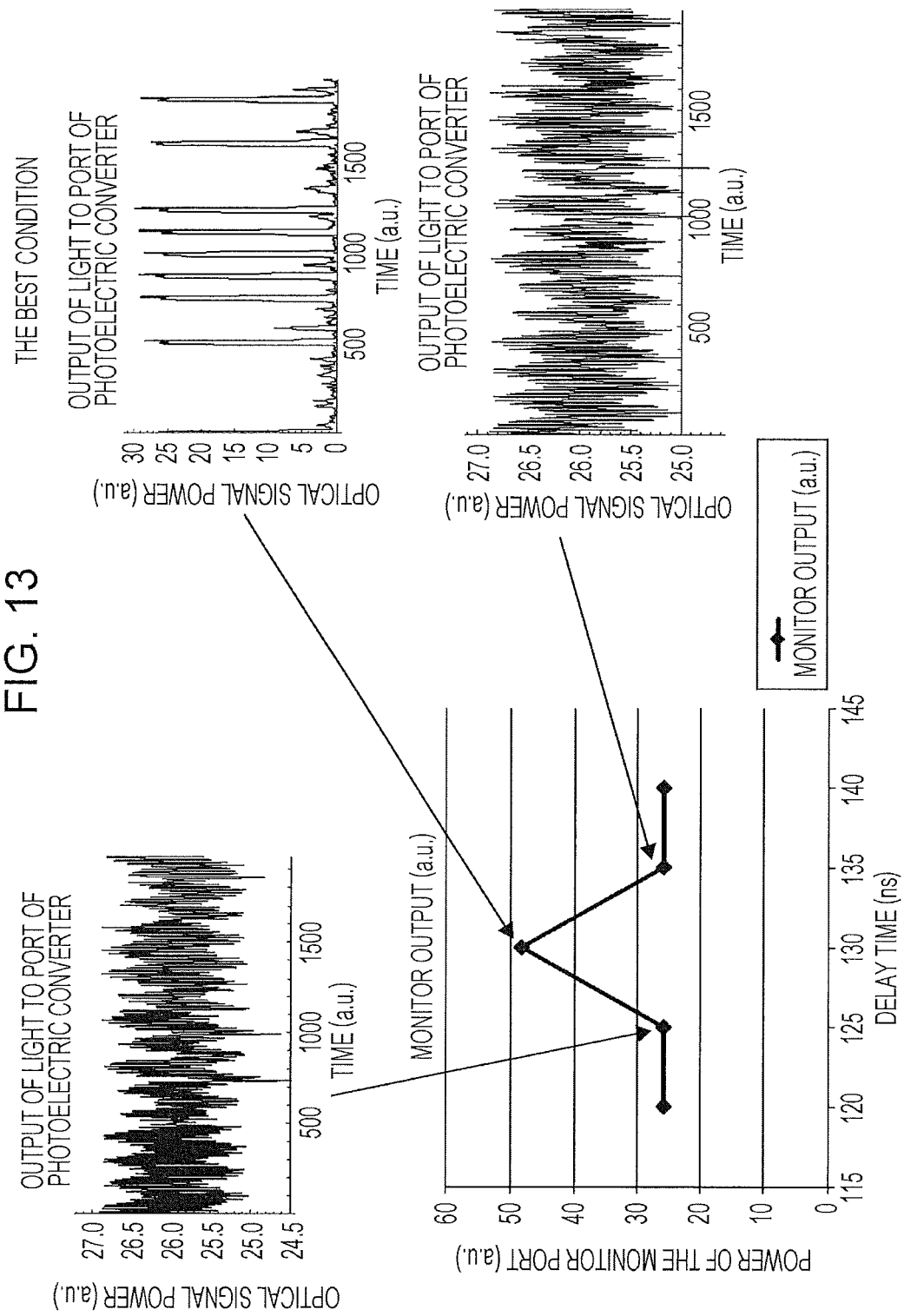
FIG. 13 is a diagram illustrating one example of average output optical power of a monitor port with respect to delay time in an optical interferometer for describing control by a control circuit illustrated in FIG. 7.

For example, when simulation calculation is performed, assuming that the bit rate of the FSK-SV signal is 1 Mb/S and a modulation period of the FSK-SV signal is 1,000 ns, as shown in FIG. 13, the SN ratio of the optical signal to be obtained becomes best if the delay time is set to 130 ns. At this time, average output of the monitor port of the optical combiner 58 reaches the maximum. Moreover, the optimal delay time changes according to the bit rate of the FSK-SV signal. For this reason, in the control circuit 60, the SN ratio of the optical signal to be obtained may be obtained to be the maximum by controlling the optical phase adjustment unit 55 such that the average output of the monitor port of the optical combiner 58 reaches the maximum.

Figure 14:
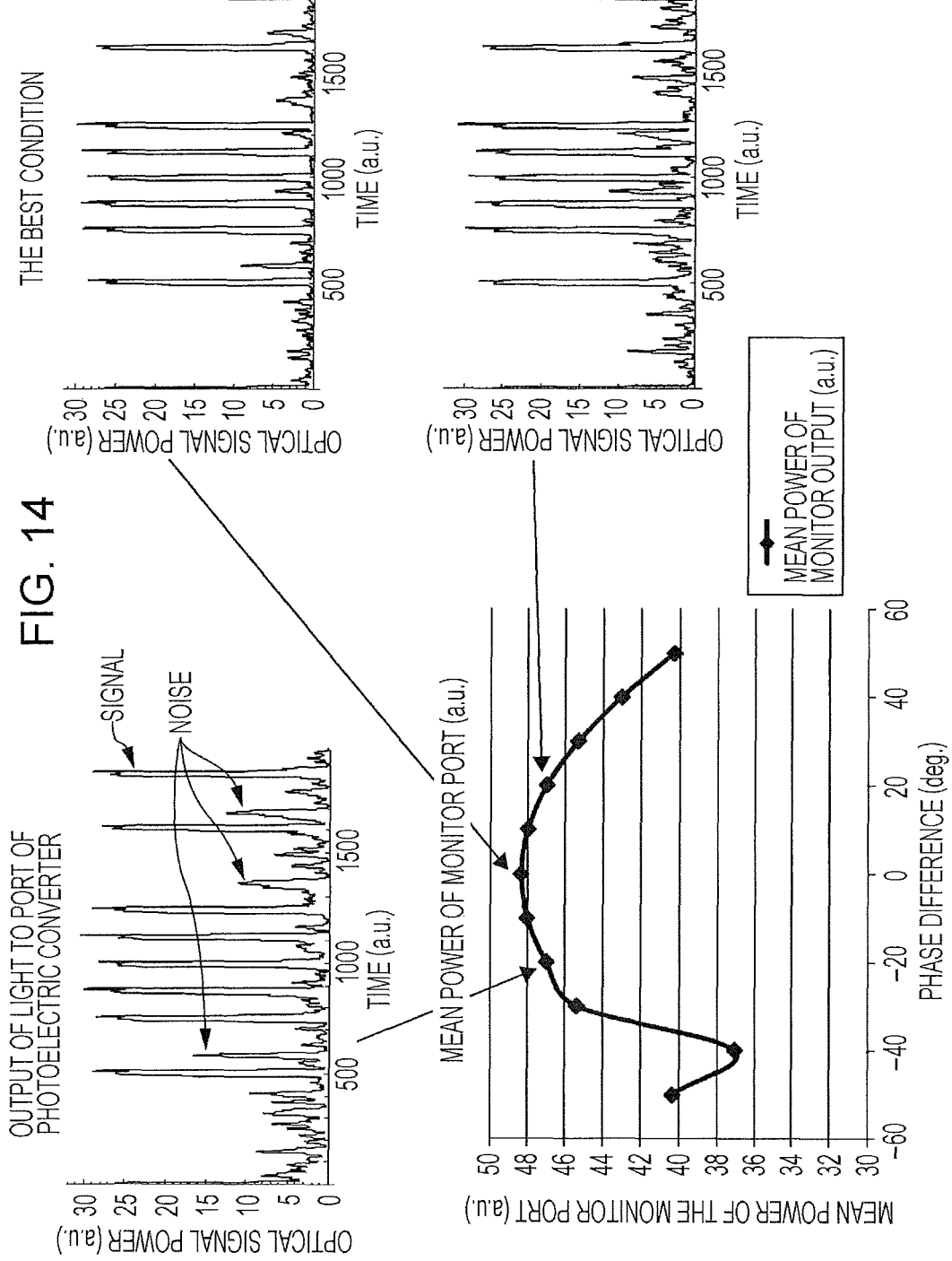
FIG. 14 is a diagram illustrating one example of the average output optical power of the monitor port with respect to a phase difference in the optical interferometer for describing control by a control circuit illustrated in FIG. 7.

Furthermore, as shown in FIG. 14, in the optical interferometer 50 illustrated in FIG. 7, if the optical signals that pass through the two optical paths are an integer multiple of $2\pi$, the SN ratio of the optical signal to be obtained becomes best and at this time, the average output of the monitor port of the optical combiner 58 reaches the maximum. Therefore, in the control circuit 60, the SN ratio of the optical signal to be obtained may be obtained to be the maximum by controlling the optical phase adjustment unit 55 such that the average output of the monitor port reaches the maximum.

FIRST MODIFICATION EXAMPLE

Figure 15:
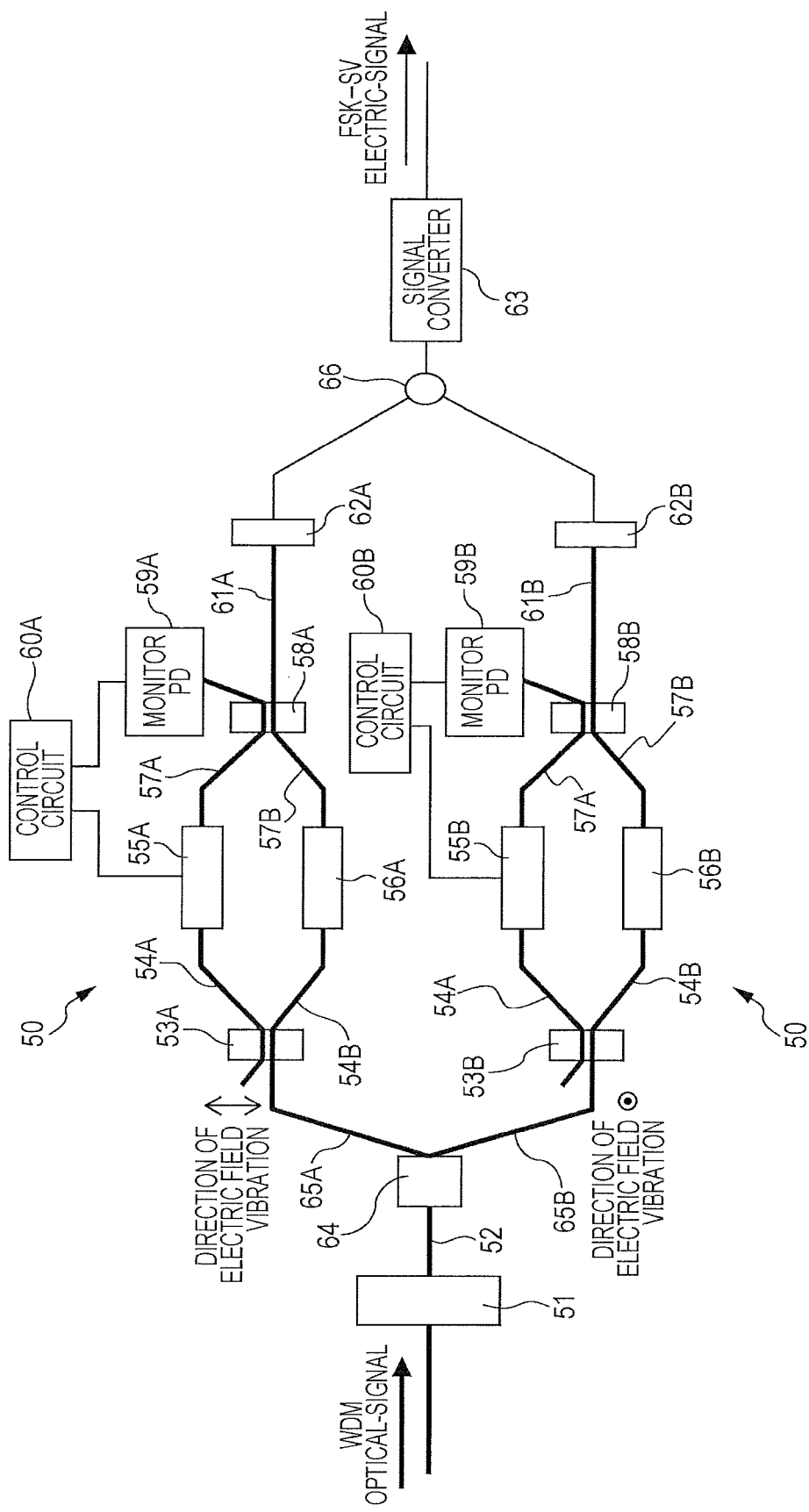
FIG. 15 is a block diagram illustrating a configuration example of an asymmetry interferometer-type FSK-SV signal demodulator according to a first modification example.

FIG. 15 is a block diagram illustrating a configuration example of an asymmetry interferometer-type FSK-SV signal demodulator according to a first modification example of the embodiment described above. The asymmetry interferometer-type FSK-SV signal demodulator illustrated in FIG. 15 is a polarization diversity configuration equivalent of the configuration illustrated in FIG. 7. That is, the signal demodulator illustrated in FIG. 15 includes a polarization separation element 64 at the rear portion of the BPF 51, and the polarization separation element 64 separates light that passes through the BPF 51, into two mutually orthogonal polarization components, and performs signal processing corresponding to a block indicated with a dotted line A in FIG. 7, on each polarization component.

The polarization separation element 64 may illustratively be realized using a polarization beam splitter or the like that uses a birefringent crystal or a multilayer coated prism. One polarization wave component (for example, a polarization wave component in which a direction of electric field vibration is the upper and lower direction with respect to a sheet of paper on which FIG. 15 is drawn) that results from the separation in the polarization separation element 64 is led to an optical splitter 53A through an optical propagation path 65A. The other polarization wave component (for example, a polarization wave component in which the direction of electric field vibration is the vertical direction with respect to the sheet of paper on which FIG. 15 is drawn) that results from the separation in the polarization separation element 64 is led to an optical splitter 53B through an optical propagation path 65B.

Each of the optical splitters 53A and 53B is the same as or similar to the optical splitter 53 illustrated in FIG. 7, and causes one polarization component that results from the separation in the polarization separation element 64, to split into two. One polarization component that is split into two in the optical splitter 53A is input, through optical propagation paths 54A and 54B, into an optical phase adjustment unit 55A and an optical delay unit 56A that correspond to the one polarization component.

The optical phase adjustment unit 55A and the optical delay unit 56A are the same as or similar to the optical phase adjustment unit 55 and the optical delay unit 56 illustrated in FIG. 7, respectively. Therefore, the optical phase adjustment unit 55A and the optical delay unit 56A give a relative phase difference as described above to the two optical signals that result from splitting one polarization component in the optical splitter 53A. The phase difference, as described above, is controlled (adjusted) by the control circuit 60A such that the average output power of a monitor PD 59A reaches the maximum.

The output light of the optical phase adjustment unit 55A and the output light of the optical delay unit 56A are input into an optical combiner 58A through corresponding optical propagation paths 57A and 57B, respectively. The optical combiner 58A is the same as or similar to the optical combiner 58 described in FIG. 7. Therefore, with respect to one polarization component, the optical combiner 58A outputs the optical pulse according to the frequency changing point of the FSK-SV signal, as illustrated in FIGS. 8 and 9. The optical pulse is led to a photoelectric converter 62A through an optical propagation path 61A.

The photoelectric converter 62A is the same as or similar to the photoelectric converter 62 illustrated in FIG. 7. Therefore, with respect to one polarization component, the photoelectric converter 62A converts the optical pulse that is output from the optical combiner 58A, into the electric signal and thus obtains the electric signal that indicates the frequency changing point of the FSK-SV signal pulse.

On the other hand, one polarization component light that is split into two in the optical splitter 53B is input, through optical propagation paths 54A and 54B, into an optical phase adjustment unit 55B and an optical delay unit 56B that correspond to the other polarization component.

The optical phase adjustment unit 55B and the optical delay unit 56B are the same as or similar to the optical phase adjustment unit 55 and the optical delay unit 56 illustrated in FIG. 7, respectively. Therefore, the optical phase adjustment unit 55B and the optical delay unit 56B give a relative phase difference as described above to the two optical signals that result from splitting the other polarization component in the optical splitter 53B. The phase difference, as described above, is controlled (adjusted) by the control circuit 60B such that the average output power of a monitor PD 59B reaches the maximum.

The output light of the optical phase adjustment unit 55B and the output light of the optical delay unit 56B are input into an optical combiner 58B through the corresponding optical propagation paths 57A and 57B, respectively. The optical combiner 58B is the same as or similar to the optical combiner 58 described in FIG. 7. Therefore, with respect to the other polarization component, the optical combiner 58B outputs the optical pulse according to the frequency changing point of the FSK-SV signal as illustrated in FIGS. 8 and 9. The optical pulse is led to a photoelectric converter 62B through an optical propagation path 61B.

The photoelectric converter 62B is the same as or similar to the photoelectric converter 62 illustrated in FIG. 7. Therefore, with respect to the other polarization component, the photoelectric converter 62B converts the optical pulse that is output from the optical combiner 58B, into the electric signal and thus obtains the electric signal that indicates the frequency changing point of the FSK-SV signal pulse.

The electric signals that are obtained in the photoelectric converters 62A and 62B according to the polarization component, respectively, converge in an electric signal combiner 66 in terms of electric current and are input into the signal converter 63. The signal converter 63 is the same as or similar to the signal converter 63 illustrated in FIG. 7, and reproduces the pulse information on the FSK-SV signal that is superimposed at the transmitting side, from the electric signal that indicates the frequency changing point of the FSK-SV signal pulse and thus reproduces the FSK-SV signal.

As described above, because the asymmetry interferometer-type FSK-SV signal demodulator that has a polarization diversity configuration performs the same signal processing on each of the polarization components that result from the separation in the polarization separation element 64, at least an optical component portion performs dual system processing.

Furthermore, an optical system, for example, a polarization maintaining optical-fiber, or the like, which maintains a polarization state of the corresponding polarization component may be used for the optical propagation paths between the polarization separation element 64 and the photoelectric converters 62A and 62B. Additionally, control by the dual system optical interferometer may be individual control, except for making the polarization components equal in an amount of optical delay to each other. However, the control (by the control circuits 60A and 60B) may be common to each of the polarization components.

Because the optical signal processing is caused to be performed on each of the polarization components by setting the FSK-SV signal demodulator to have the polarization diversity configuration, a change in an interference state of light due to a change in a polarization state within an optical unit (within the optical propagation path), which occurs in a case of a common configuration that is not the polarization diversity configuration, is suppressed. Therefore, more stability is secured than in the case of the common configuration and thus the FSK-SV signal may be received.

SECOND MODIFICATION EXAMPLE

Figure 16:
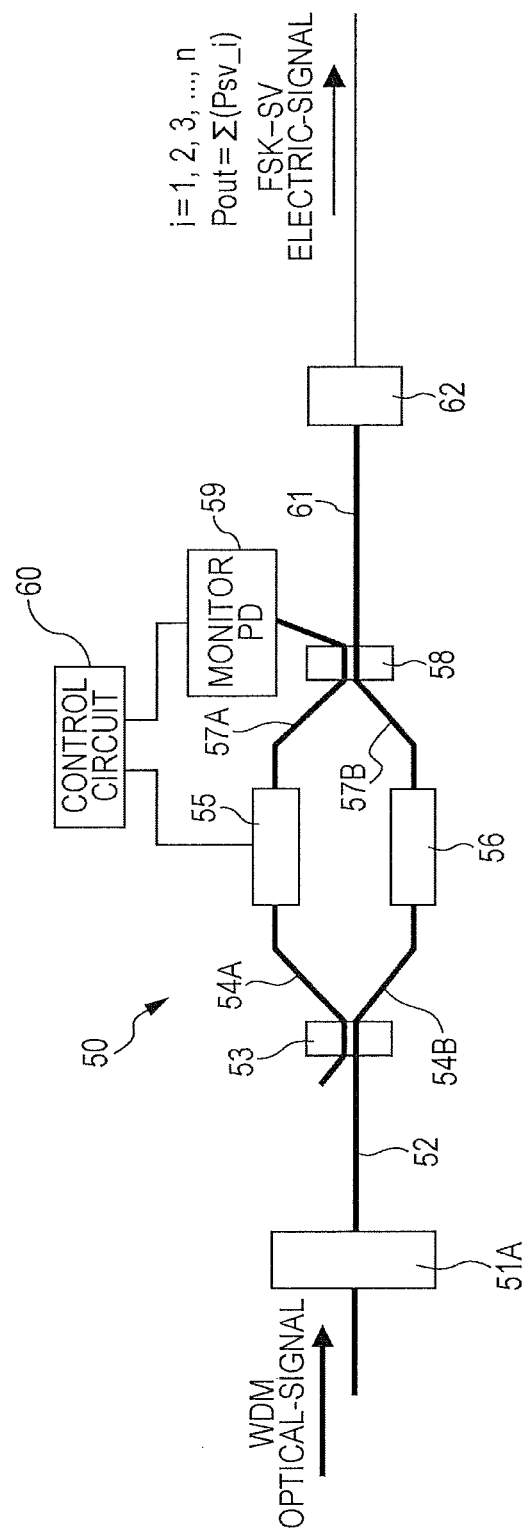
FIG. 16 is a block diagram illustrating a configuration example of an asymmetry interferometer-type FSK-SV signal demodulator according to a second modification example.

FIG. 16 is a block diagram illustrating a configuration example of an asymmetry interferometer-type FSK-SV signal demodulator according to a second modification example of the embodiment described above. When compared with the configuration illustrated in FIG. 7, the asymmetry interferometer-type FSK-SV signal demodulator illustrated in FIG. 16 is different in that an etalon-type optical filter 51A is provided instead of the optical filter 51.

Figure 17:
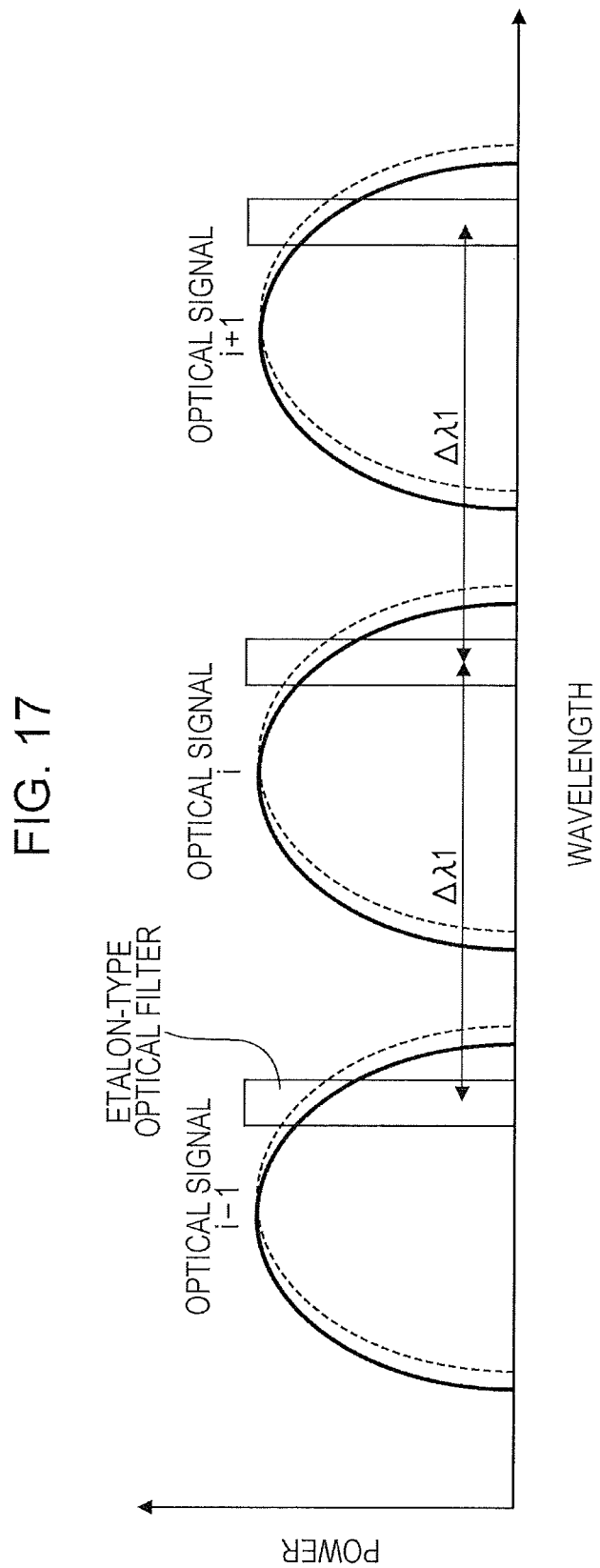
FIG. 17 is a diagram for describing a periodic pass band of an etalon-type optical filter illustrated in FIG. 16.

The etalon-type optical filter 51A, as illustrated in FIG. 17, has a pass band that changes periodically with respect to a wavelength. Moreover, a spectrum of each channel of the WDM signal is illustrated in FIG. 17. The spectrum of each of channels (i−1), i, (i+1) is doubly depicted with solid and dashed lines and this indicates an aspect in which the spectrum changes due to the FSK-SV signal.

Each channel for the input WDM signal is illustratively arranged at an invariable or almost invariable wavelength interval. As one nonrestrictive example, the channel is arranged at an interval of 50 GHz. Then, the FSK-SV signals are multiplexed on the optical signal on each channel.

The etalon-type optical filter 51A, as illustrated in FIG. 17, has the pass band at the interval of $\Delta\lambda 1$. Moreover, $\Delta\lambda 1$ is almost the same as the interval at which each channel for the input WDM signal is arranged.

The etalon-type optical filter 51A, illustrated in FIG. 17, is controlled such that the pass band is arranged that corresponds to the long wavelength side (or may correspond to the short wavelength side) of the central wavelength of the spectrum of each channel for the WDM signal. If the etalon-type optical filter 51A is controlled as illustrated above, a component that is extracted from each channel for the WDM signal is substantially the same as in the embodiment illustrated in FIGS. 7 and 8.

Therefore, in the photoelectric converter 62, a signal is obtained that is equivalent to a signal that results from combining the electric signals indicating the frequency changing points of the FSK-SV signals ($P_{sv\_i}$) that are included in the input WDM signal and which are superimposed onto each channel (i). Therefore, the FSK-SV signal may be demodulated, with high precision, from the optical signal in the input WDM signal.

Figures 18, 19:
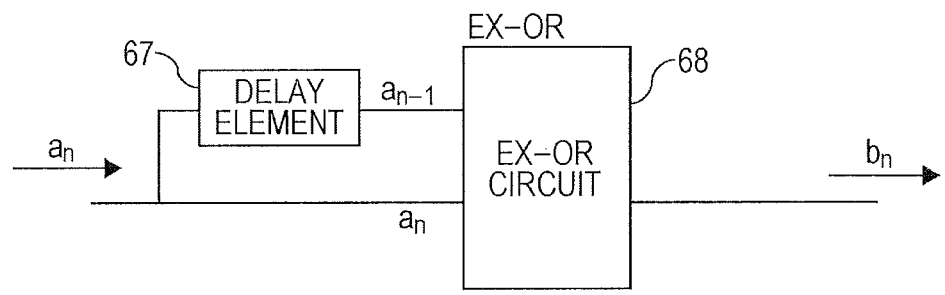
FIG. 18 is a block diagram illustrating a configuration example of a differential encoder according to the second modification example.
FIG. 19 is a diagram illustrating one example of a truth-value table of the differential encoder illustrated in FIG. 18.

FIG. 18 is a block diagram illustrating a configuration example of a differential encoder according to the second modification example. The differential encoder illustrated in FIG. 18 is possible to apply to the optical transmitter illustrated in FIGS. 2 and 3. For example, a signal $b_n$ that is differential-encoded by the differential encoder illustrated in FIG. 18 may be used as the "supervisory signal" in the optical transmitter illustrated in FIGS. 3A and 3B.

The differential encoder illustratively includes a delay element 67 that outputs a delay signal $a_{n-1}$ by delaying an input signal $a_n$, and an EX-OR circuit 68 that outputs a differential encoder signal $b_n$ by performing an exclusive-or (EX-OR) operation on the input signal $a_n$ and the delay signal $a_{n-1}$. Moreover, FIG. 19 illustrates a truth-value table of the differential encoder. The differential encoder generates and outputs a differential encode signal $b_n$ according to the truth-value table.

Figure 20:
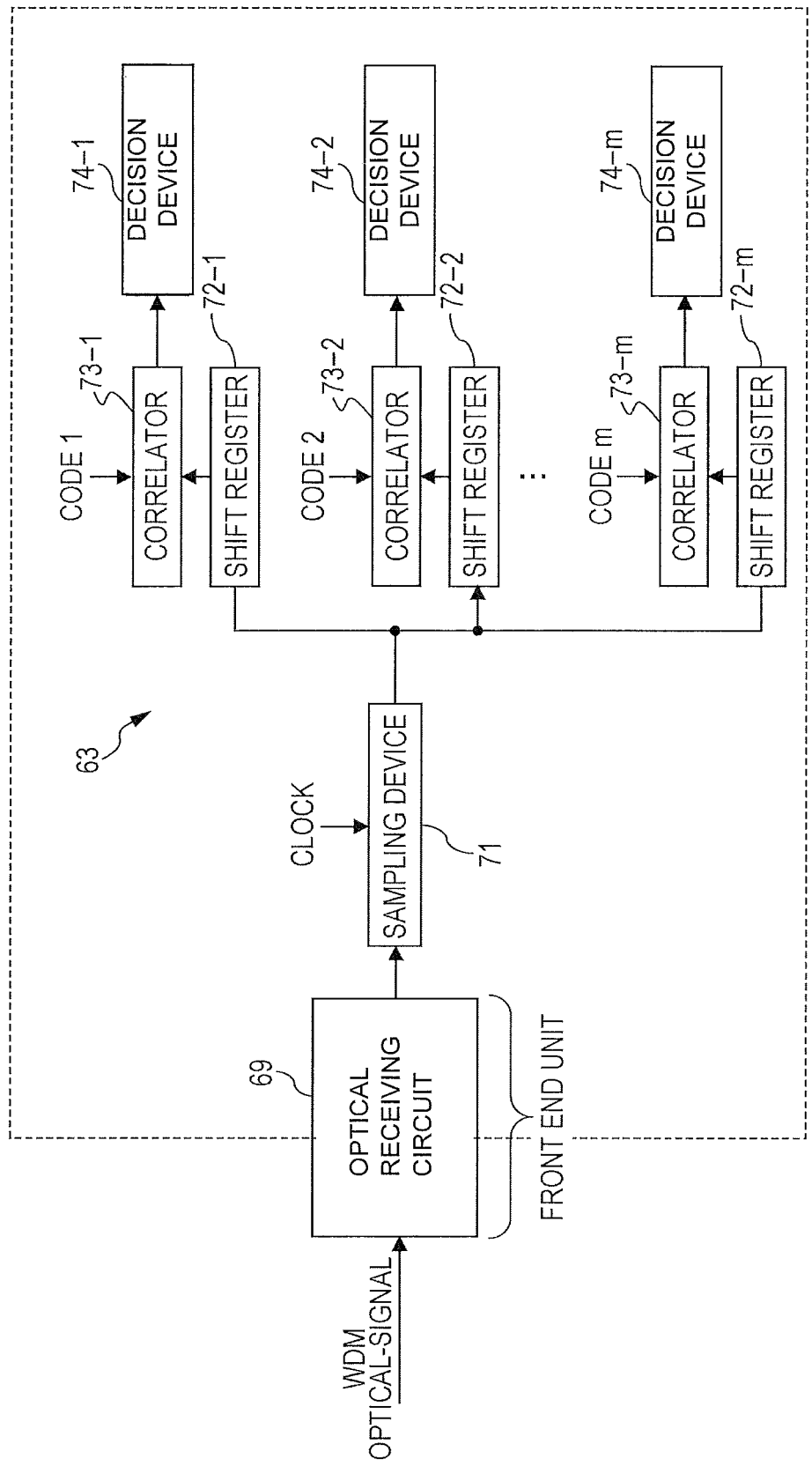
FIG. 20 is a block diagram illustrating a configuration example of a signal converter according to the second modification example.

FIG. 20 is a block diagram illustrating a configuration example of the signal converter 63 described above. An output (electric signal) of an optical receiving unit 69 of a front end unit is input into the signal converter 63. The optical receiving unit 69 illustratively includes a preceding units of the signal converter 63 in the configuration illustrated in FIG. 7 or 15, or includes the configuration illustrated in FIG. 16.

At this point, the signal converter 63 may demodulate the FSK-SV signals that are multiplexed on the optical signal on each channel for the WDM signal.

In this example, the FSK-SV signal is realized with mutually orthogonal codes. Furthermore, the WDM signal is set to accommodate m wavelength channels. In this case, the signal converter 63 has a sampling device 71, shift registers 72-1 to 72-$m$, correlators 73-1 to 73-$m$, and decision devices 74-1 to 74-$m$. Moreover, if the input WDM signal is generated by the WDM transmission apparatus illustrated in FIG. 2, preferably, a relationship between m and n is m=n.

The sampling device 71 samples a signal that is output from the optical receiving unit 69. A frequency of a sampling clock, for example, is the same as a bit rate (or a chip rate) of a code indicating the FSK-SV signal. Then, a sample data stream that is obtained by the sampling device 71 is led to the shift registers 72-1 to 72-$m$. Each length of the shift registers 72-1 to 72-$m$ is the same as a bit length of the code indicating the FSK-SV signal.

The correlators 73-1 to 73-$m$ are given corresponding codes 1 to m, respectively. The codes 1 to m, for example, are given by the NMS 10 illustrated in FIG. 1. Furthermore, the codes 1 to m are codes that are expected to be multiplexed on the optical signal in the input WDM signal. Then, each of the correlators 73-1 to 73-$m$ calculates correlations between the codes 1 to m and the sample data streams that are retained in the shift registers 72-1 to 72-$m$, respectively. Moreover, contents of each of the codes 1 to m is not fixed information, and indicates the number of the concurrent signal processing tasks in parallel that are performed by the signal converter 63.

Generally, a total number of pieces of code information that are managed by the NMS 10 illustrated in FIG. 1 is greater than m.

The decision devices 74-1 to 74-$m$ compare correlation values that are calculated by the correlators 73-1 to 73-$m$, respectively, with a threshold. Then, the decision devices 74-1 to 74-$m$ determine whether the codes 1 to m are demodulated, based on a result of this comparison. For example, if the correlation value that is calculated by the correlator 73-1 is greater than the threshold, the decision device 74-1 extracts the FSK-SV signal from a channel 1 for the input WDM signal.

As described above, in one or more transmission sides, the FSK-SV signal on each channel, which is realized with the codes that intersect each other orthogonally and which is included in the WDM optical-signal, is made a differential signal and thus is transmitted. A transmission signal turns into the WDM optical-signal that results from the proper combination by the ROADM, and receives the FSK-SV signal on each channel, which is included in that WDM optical-signal, differentially received in the photodetector 69 and thus converts the differentially-received FSK-SV signal into the electric signal. In this state of the electric signal, the signal converter 63 may receive (in parallel perform receiving processing on) the electric signal, at the same time, that is restored to the mutually orthogonal codes.

Light Transmitting Apparatus

Figure 21:
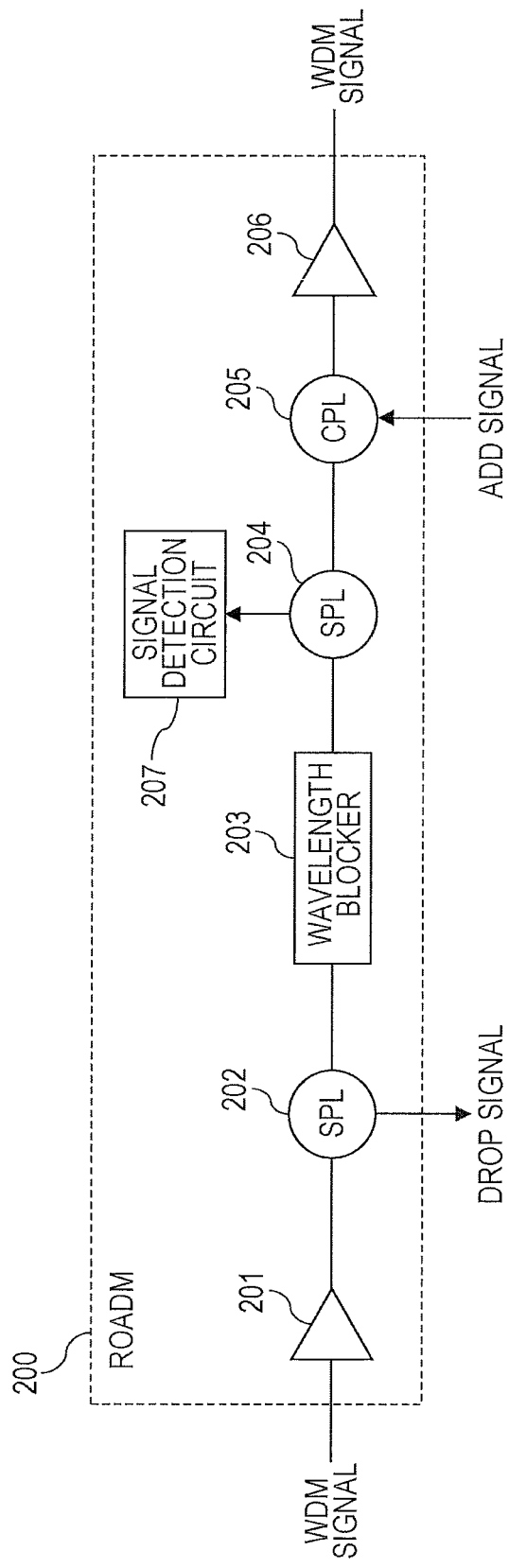
FIG. 21 illustrates one example of an optical transmission apparatus that includes a circuit (a signal demodulator) which demodulates the FSK-SV signal.

FIG. 21 illustrates one example of an optical transmission apparatus that includes a circuit (a signal demodulator) which demodulates the FSK-SV signal. The optical transmission apparatus illustrated in FIG. 21 is illustratively an ROADM 200. The ROADM 200 has an optical amplifier 201, an optical splitter 202, a wavelength blocker 203, an optical splitter 204, an optical coupler 205, an optical amplifier 206, and a signal detection circuit 207. The signal detection circuit 207 includes configurations illustrated in FIG. 7, 15, 16, or 20.

The optical amplifier 201 amplifies the input WDM signal. The optical splitter 202 leads the WDM signal amplified by the optical amplifier 201 to the wavelength blocker 203 and splits WDM signal and thus generates a drop signal. The drop signal, for example, is led to a wavelength selection device or a demultiplexer not illustrated. The wavelength selection device selects the designated wavelength from the drop signal and thus leads the selected designated wavelength to a client terminal. The demultiplexer demultiplexes the drop signal at every wavelength. In this case, some of, or all of the multiple optical signals that are obtained by the demultiplexer are led to the client terminal.

For example, according to an instruction from the network management system 10, the wavelength blocker 203 allows the designated wavelength in the input WDM signal to pass through and blocks other wavelengths. The optical splitter 204 splits the optical signal that is output from the wavelength blocker 203, and thus leads the split optical signals to the optical coupler 205 and the signal detection circuit 207. The optical coupler 205 generates an output WDM signal by adding an add signal to the optical signal that is output from the optical splitter 204. The add signal, for example, is transmitted from the client terminal. Then, the optical amplifier 206 amplifies the output WDM signal that is obtained by the optical coupler 205. Moreover, the ROADM 200 may be configured to have a wavelength selection switch, instead of the wavelength blocker 203 illustrated in FIG. 21.

Operation of the signal detection circuit 207 is as described referring to FIGS. 7 to 20. That is, the signal detection circuit 207 demodulates the FSK-SV signals that are superimposed onto any channel for the WDM signal that is led from the optical splitter 204.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frequency modulation signal demodulator, comprising:
   an optical signal that has a wavelength, a frequency modulation signal being superimposed onto the optical signal;
   an optical filter that inputs the optical signal and has a central wavelength of a pass band at a wavelength that is shifted from a central wavelength of a spectrum of the optical signal and that is set to allow the pass band to be located at one portion of the spectrum;
   an asymmetry optical interferometer that demodulates the frequency modulation signal by splitting light which has passed through the optical filter, delaying different time between split lights, and interfering the split lights.

2. The frequency modulation signal demodulator according to claim 1, further comprising:
   a monitor that monitors output optical power of the optical interferometer; and
   a control circuit that adjusts the delay difference such that a temporal average value of the output optical power monitored in the monitor reaches the maximum.

3. The frequency modulation signal demodulator according to claim 1, further comprising:
   a polarization separation element that separates the output light of the optical filter into different polarization components,
   wherein the optical interferometer is respectively provided to the polarization components.

4. The frequency modulation signal demodulator according to claim 1,
   wherein the pass band of the optical filter is set to have a bandwidth narrower than half of the spectrum of the optical signal having the wavelength.

5. The frequency modulation signal demodulator according to claim 1,
   wherein the optical filter is an etalon-type optical filter.

6. The frequency modulation signal demodulator according to claim 1,
   wherein a relative phase difference is approximately $\pi/10$ in a frequency changing point of the optical signal of the delay interferometer.

7. A light receiving apparatus that receives an optical signal onto which a frequency modulation signal is superimposed, the light receiving apparatus comprising:
   an optical filter that has a central wavelength of a pass band at a wavelength that is shifted from a central wavelength of a spectrum of an optical signal having a wavelength, a frequency modulation signal being superimposed onto the optical signal, and that is set to allow the pass band to be located at one portion of the spectrum; and
   an asymmetry optical interferometer that demodulates the frequency modulation signal by splitting light which has passed through the optical filter, delaying different time between split lights, and interfering the split lights.

* * * * *